(12) United States Patent
Dickau

(10) Patent No.: US 6,918,244 B2
(45) Date of Patent: Jul. 19, 2005

(54) VERTICAL TAKEOFF AND LANDING AIRCRAFT PROPULSION SYSTEMS

(76) Inventor: John Eugene Dickau, #1108, 9837 - 110 Street, Edmonton (CA), T5K 2L8

( * ) Notice: Subject to any disclaimer, the term of this patent is extended or adjusted under 35 U.S.C. 154(b) by 0 days.

(21) Appl. No.: 10/216,395

(22) Filed: Aug. 12, 2002

(65) Prior Publication Data

US 2003/0033798 A1 Feb. 20, 2003

Related U.S. Application Data

(60) Provisional application No. 60/312,761, filed on Aug. 17, 2001.

(51) Int. Cl.[7] ............................................. F02K 1/64
(52) U.S. Cl. .................... 60/229; 244/12.5; 239/265.27
(58) Field of Search ............................... 244/12.1, 12.5; 60/228, 230, 229; 239/265.19, 265.27

(56) References Cited

U.S. PATENT DOCUMENTS

| | | | |
|---|---|---|---|
| 3,174,709 A | * | 3/1965 | Alderson .................. 244/23 D |
| 3,972,490 A | | 8/1976 | Zimmermann |
| 3,986,687 A | | 10/1976 | Beavers |
| 3,994,128 A | | 11/1976 | Griswold |
| 4,000,610 A | | 1/1977 | Nash |
| 4,004,755 A | * | 1/1977 | Hooper ...................... 244/12.5 |
| 4,038,818 A | | 8/1977 | Snell |
| 4,047,842 A | | 9/1977 | Avena |
| 4,074,859 A | | 2/1978 | Lowman |
| 4,175,385 A | | 11/1979 | Nash |
| 4,280,660 A | | 7/1981 | Wooten |
| 4,361,281 A | | 11/1982 | Nash |
| 4,474,345 A | | 10/1984 | Musgrove |
| 4,519,543 A | | 5/1985 | Szuminski |
| 4,587,803 A | | 5/1986 | Nightingale |
| 4,587,804 A | | 5/1986 | Horinouchi |
| 4,587,806 A | | 5/1986 | Madden |
| 4,660,767 A | | 4/1987 | Scrace |
| 4,690,329 A | | 9/1987 | Madden |
| 4,791,783 A | | 12/1988 | Neitzel |
| 4,805,401 A | | 2/1989 | Thayer et al. |
| 4,836,451 A | | 6/1989 | Herrick et al. |
| 4,948,072 A | | 8/1990 | Garland |
| 5,042,746 A | * | 8/1991 | Sully et al. ................. 244/12.5 |
| H1024 H | | 3/1992 | Meister |
| 5,107,675 A | | 4/1992 | Roberts |
| 5,161,752 A | | 11/1992 | Cockerham |
| 5,209,428 A | | 5/1993 | Bevilaqua et al. |
| 5,255,850 A | | 10/1993 | Cockerham |
| 5,275,356 A | | 1/1994 | Bollinger et al. |
| 5,282,719 A | | 2/1994 | McCarty |
| 5,351,888 A | | 10/1994 | Taylor et al. |
| RE35,387 E | * | 12/1996 | Strom ....................... 244/75 R |
| 5,690,280 A | | 11/1997 | Holowach |
| 5,769,317 A | | 6/1998 | Sokhey et al. |
| 5,779,169 A | * | 7/1998 | Sloan ......................... 244/12.3 |
| 5,794,432 A | | 8/1998 | Dunbar |
| 5,897,078 A | | 4/1999 | Burnham et al. |
| 5,996,935 A | | 12/1999 | Snell |
| 6,079,667 A | * | 6/2000 | Gruensfelder ............. 244/53 B |
| 6,371,407 B1 | * | 4/2002 | Renshaw .................... 244/12.5 |
| 6,729,575 B2 | * | 5/2004 | Bevilaqua ................. 244/12.3 |
| 2003/0183723 A1 | * | 10/2003 | Bevilaqua ................. 244/12.5 |

* cited by examiner

Primary Examiner—Ehud Gartenberg

(57) ABSTRACT

This patent concerns VTOL propulsion systems that develop a forward flow of air through the air intake duct(s), by the methods of a internal duct system, reversing the rotation of the fan, or a variable pitch (thrust reversing) fan.

21 Claims, 24 Drawing Sheets

Schematic lateral cross sectional diagram of the VTOL variable pitch additional fan propulsion system showing air flow in the VTOL mode Schematic lateral cross sectional diagram of the VTOL variable pitch additional fan propulsion system showing air flow in the forward flight

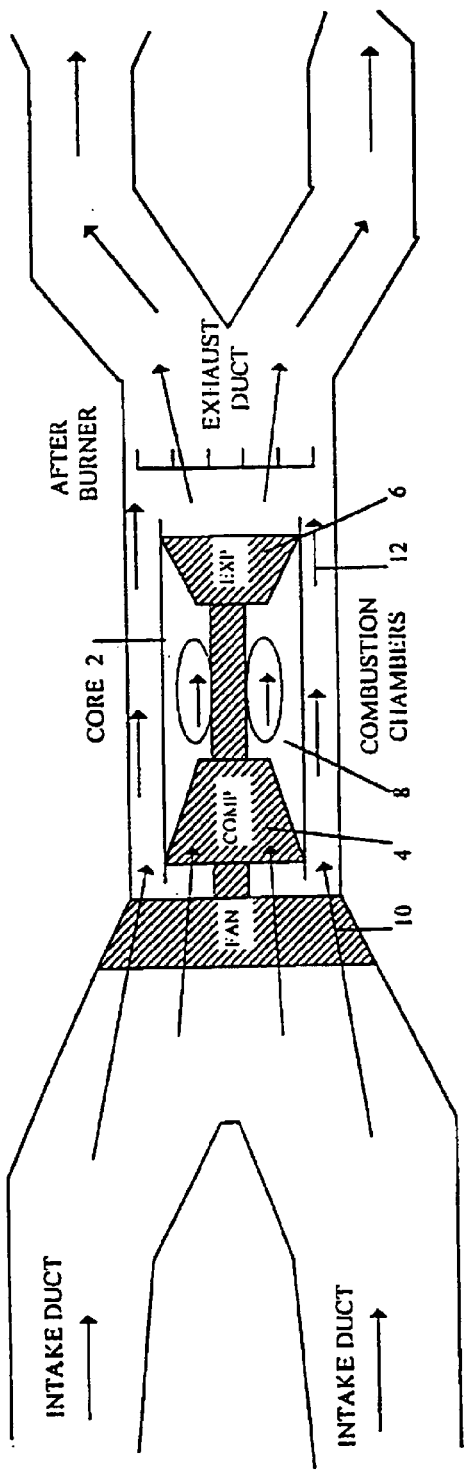
FIGURE 1 Cross sectional schematic view of a aircraft turbofan propulsion system
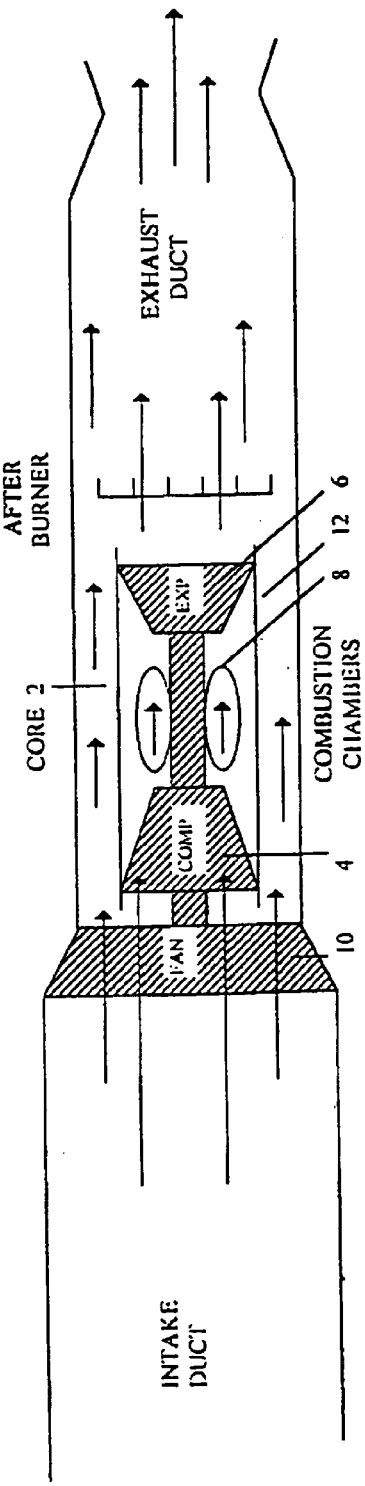
FIGURE 2 Lateral cross sectional schematic view of a aircraft turbofan propulsion system

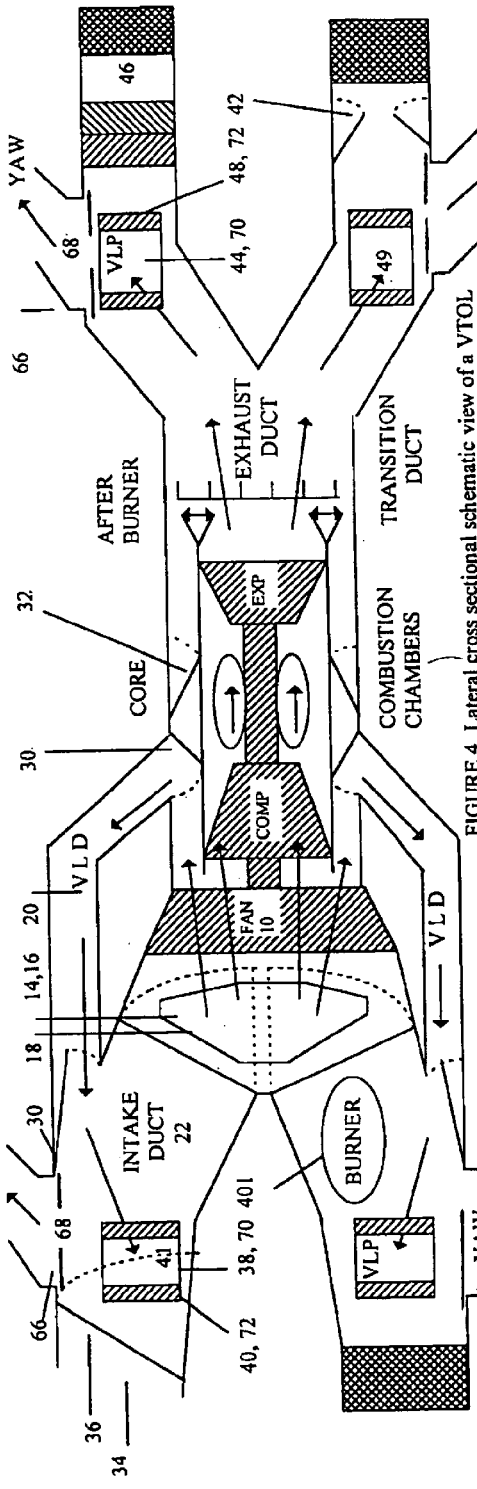
FIGURE 3 Cross sectional schematic view of a VTOL internal duct propulsion system showing air flow in the VTOL mode and the laterally moving flap thrust vectoring system.
FIGURE 4 Lateral cross sectional schematic view of a VTOL internal duct propulsion system showing air flow in the VTOL mode and the laterally moving flap thrust vectoring system.

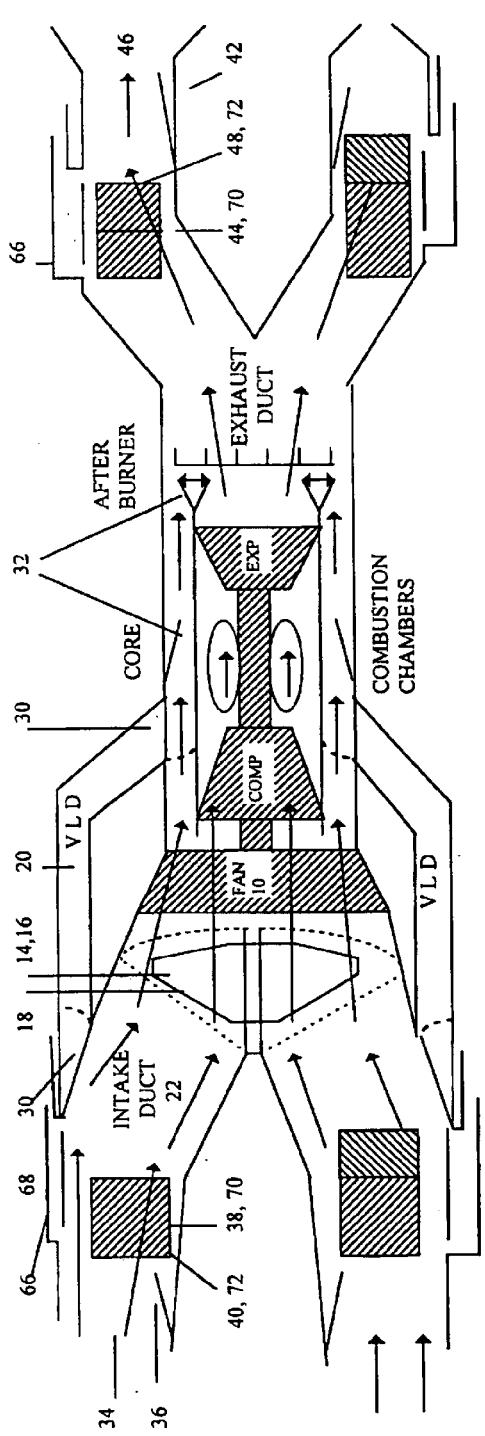
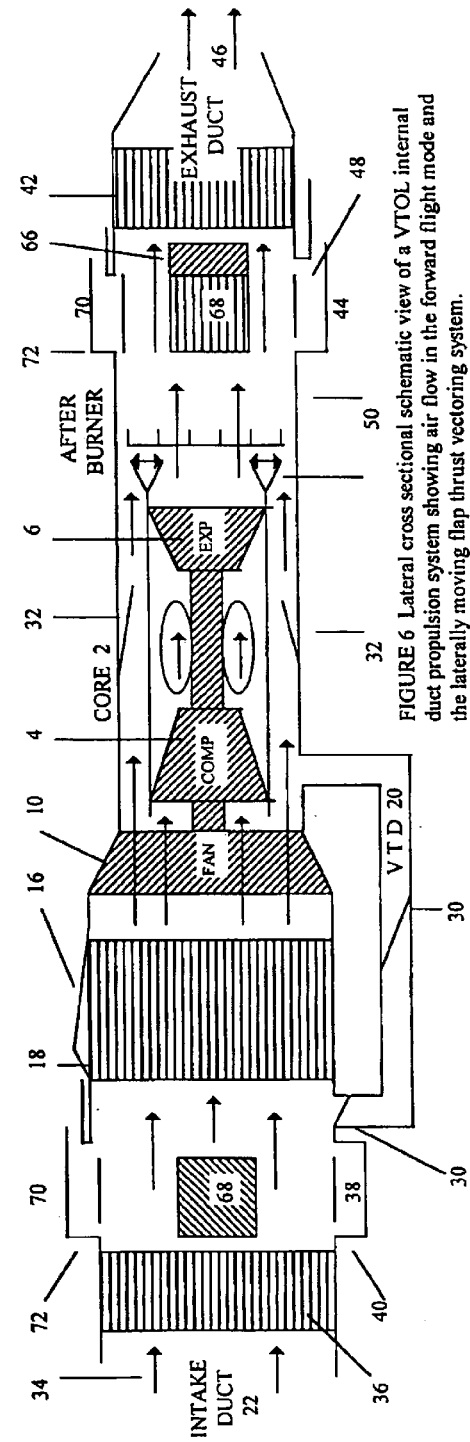

FIGURE 5 Cross sectional schematic view of a VTOL internal duct propulsion system showing air flow in the forward flight mode and the laterally moving flap thrust vectoring system.

FIGURE 6 Lateral cross sectional schematic view of a VTOL internal duct propulsion system showing air flow in the forward flight mode and the laterally moving flap thrust vectoring system.

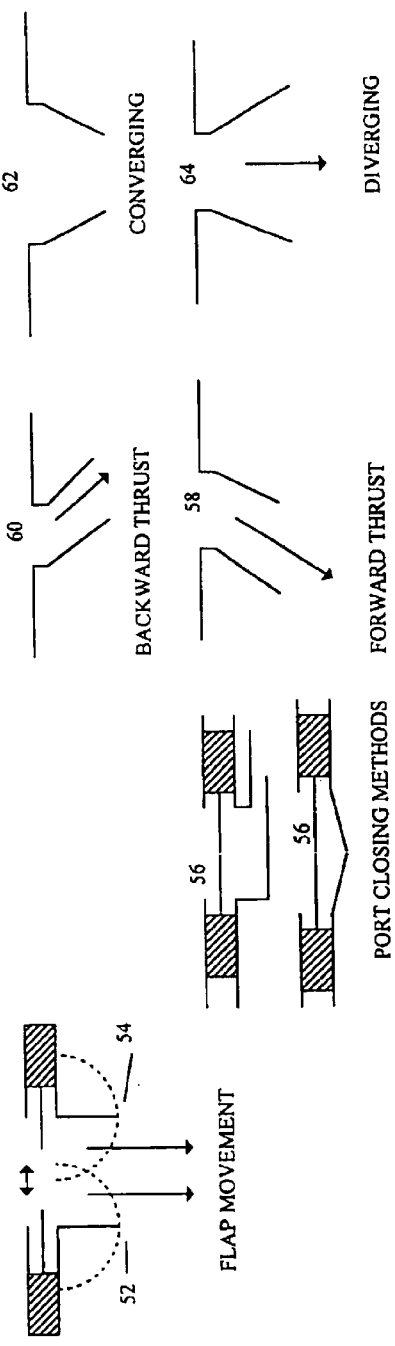
FIGURE 7 Independently operated laterally moving flaps
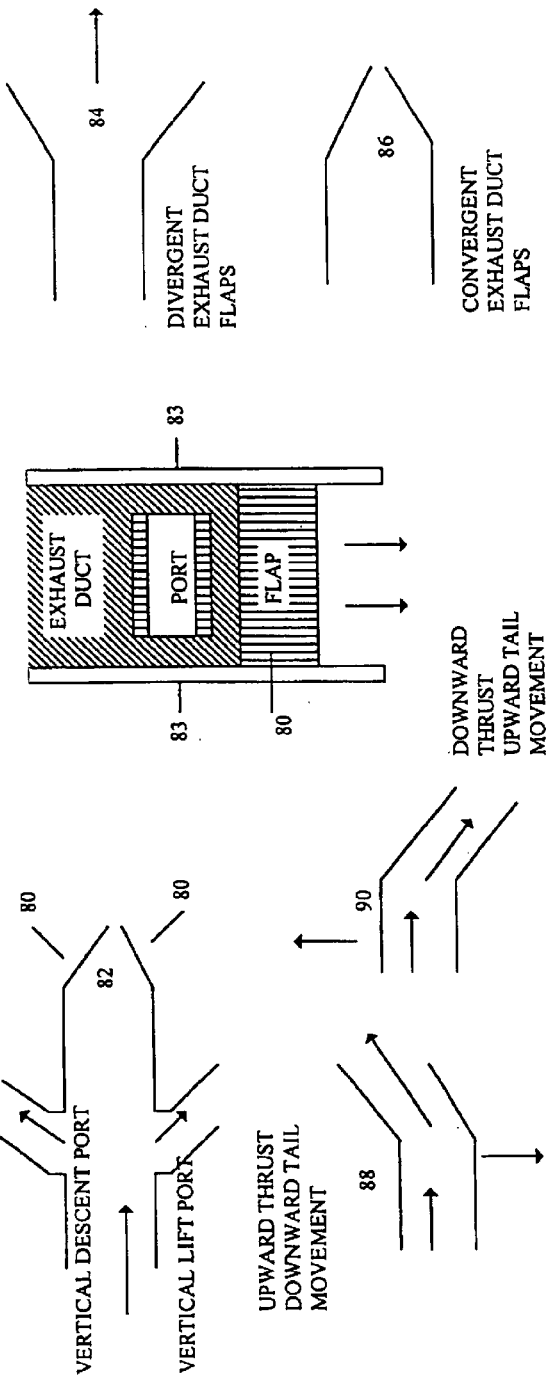
FIGURE 8 Exhaust duct flap system and vertical lift and descent port operation for increased forward flight performance

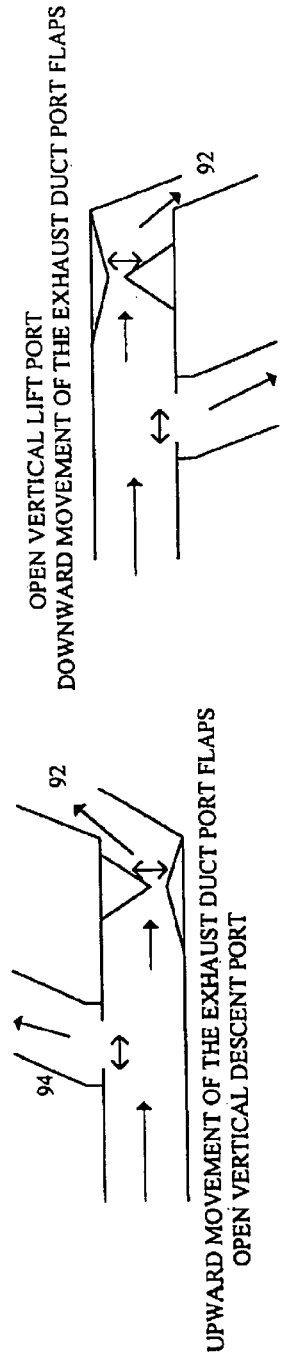
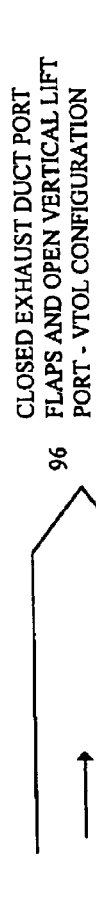
FIGURE 9 Exhaust duct flap system and vertical lift and descent port operation for increased forward flight performance
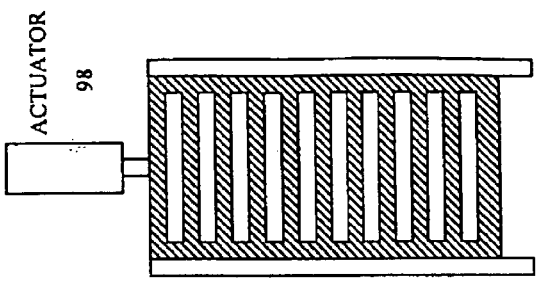
FIGURE 12 SLIDING SLOTTED PANEL FOR PORT APERTURE CONTROL
FIGURE 11 SLIDING SOLID PANEL FOR PORT APERTURE CONTROL
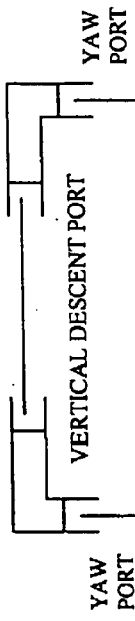
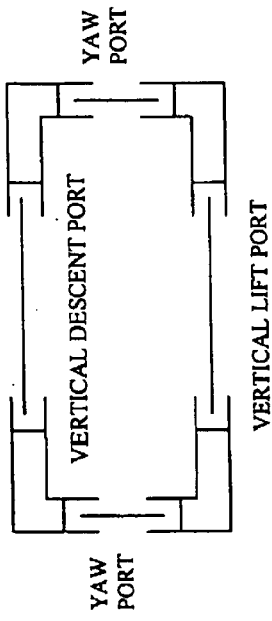
FIGURE 10 CROSS SECTION OF SLIDING PANELS OF A DUCT

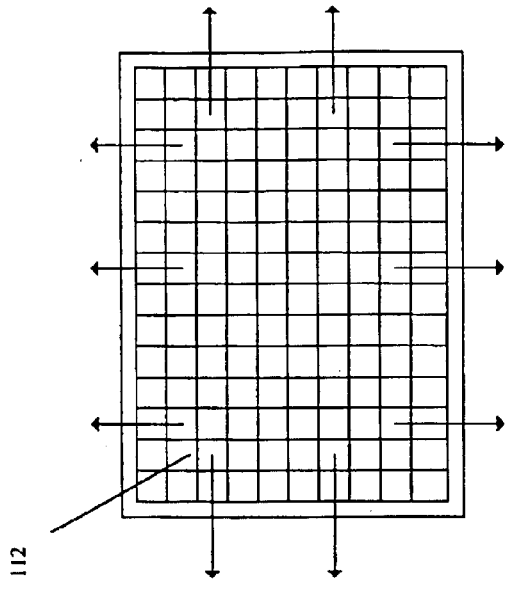
FIGURE 14 FRONTAL VEIW OF THE 2D ROTATIONAL VANE SYSTEM
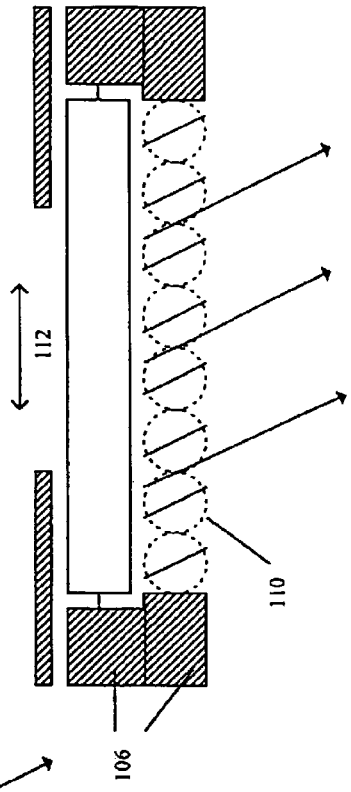
FIGURE 15 CROSS SECTIONAL VEIW OF SLIDING PANELS AND 2D ROTATIONAL VANE SYSTEM
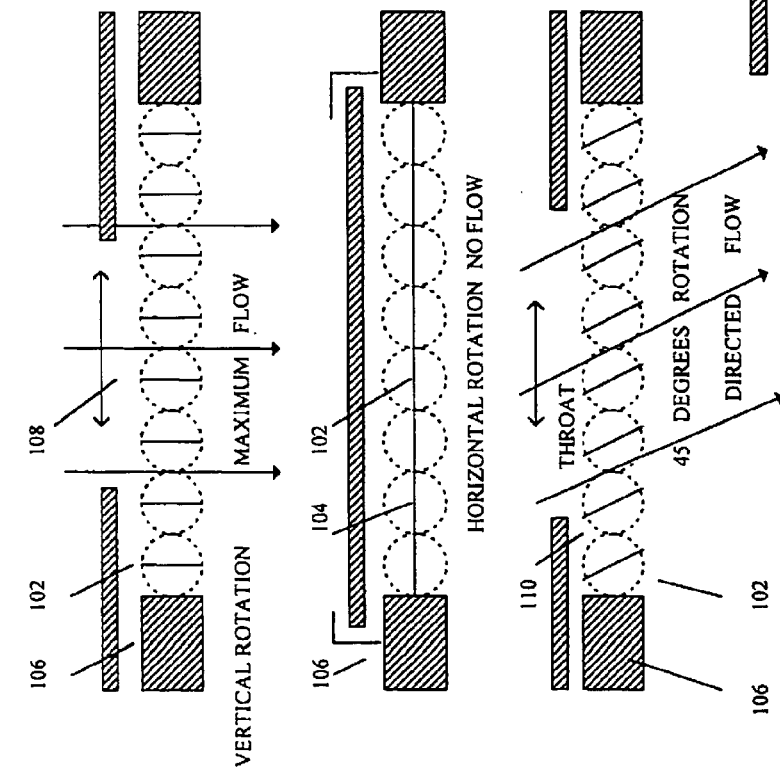
FIGURE 13 ROTATIONAL VANES AND SLIDING PANELS

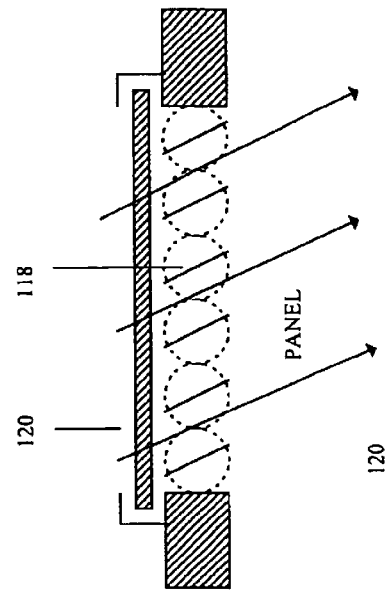
FIGURE 18 Single rotational vane system combined with a sliding panel
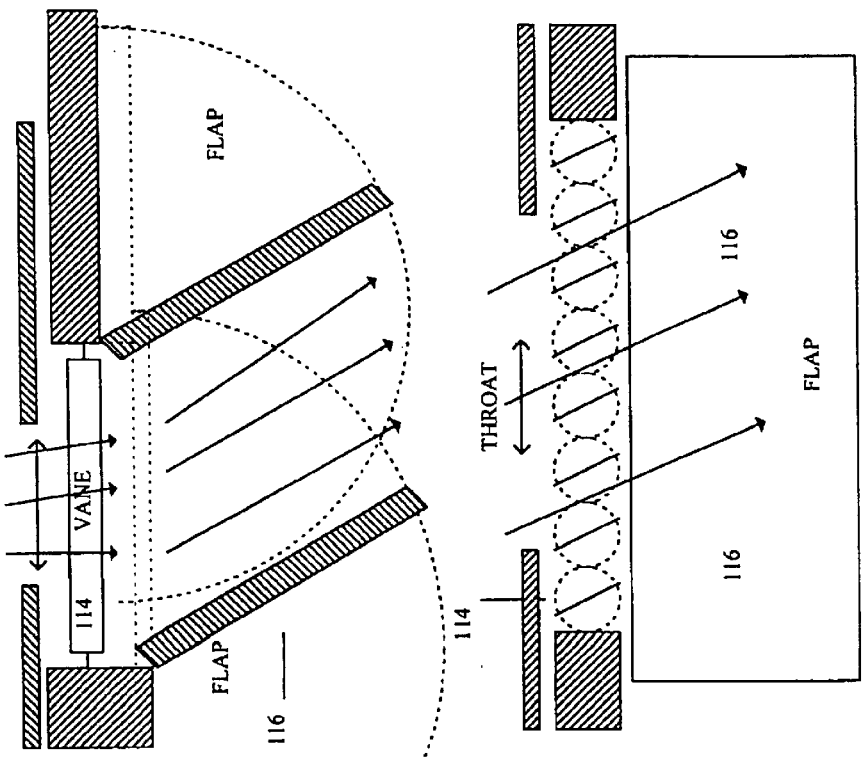
FIGURE 16 Cross sectional view of a single rotational vane system combined with a laterally moving flap
FIGURE 17 Cross sectional view of a single rotational vane system combined with a laterally moving flap

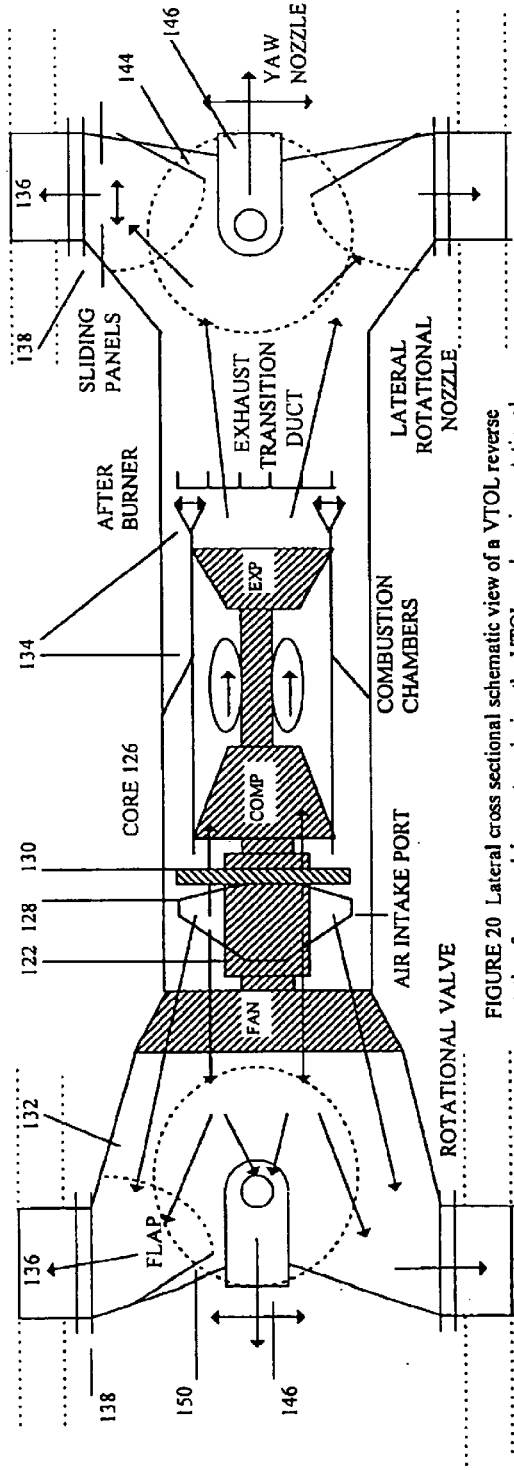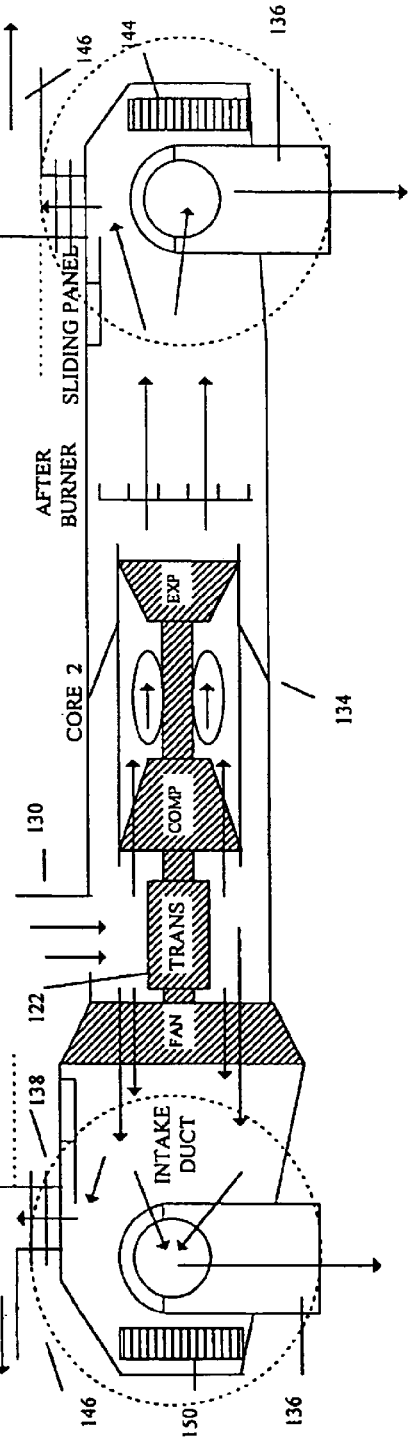
FIGURE 19 Cross sectional schematic view of a VTOL reverse rotation fan propulsion system during the VTOL mode, using rotational nozzle thrust vectoring systems.
FIGURE 20 Lateral cross sectional schematic view of a VTOL reverse rotation fan propulsion system during the VTOL mode, using rotational nozzle thrust vectoring systems.

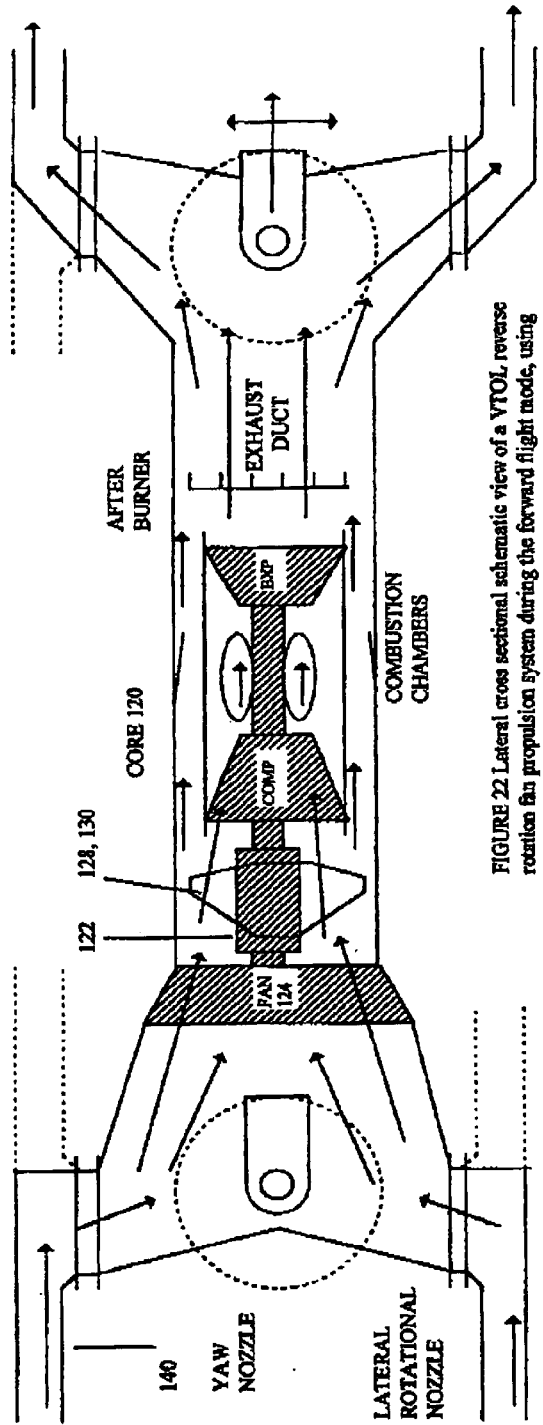
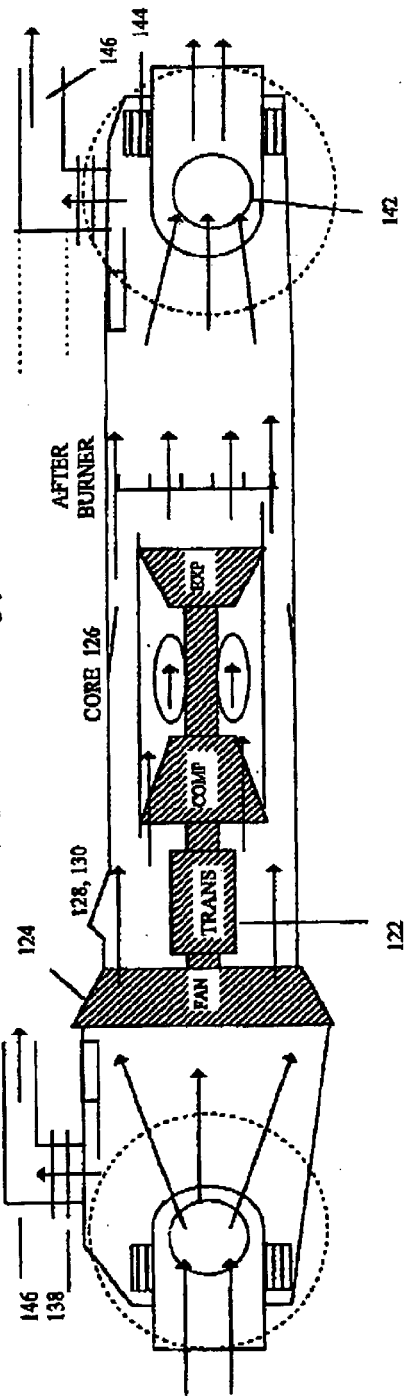
FIGURE 21 Cross sectional schematic view of a VTOL reverse rotation fan propulsion system during the forward flight mode, using rotational nozzle thrust vectoring systems.
FIGURE 22 Lateral cross sectional schematic view of a VTOL reverse rotation fan propulsion system during the forward flight mode, using rotational nozzle thrust vectoring systems.

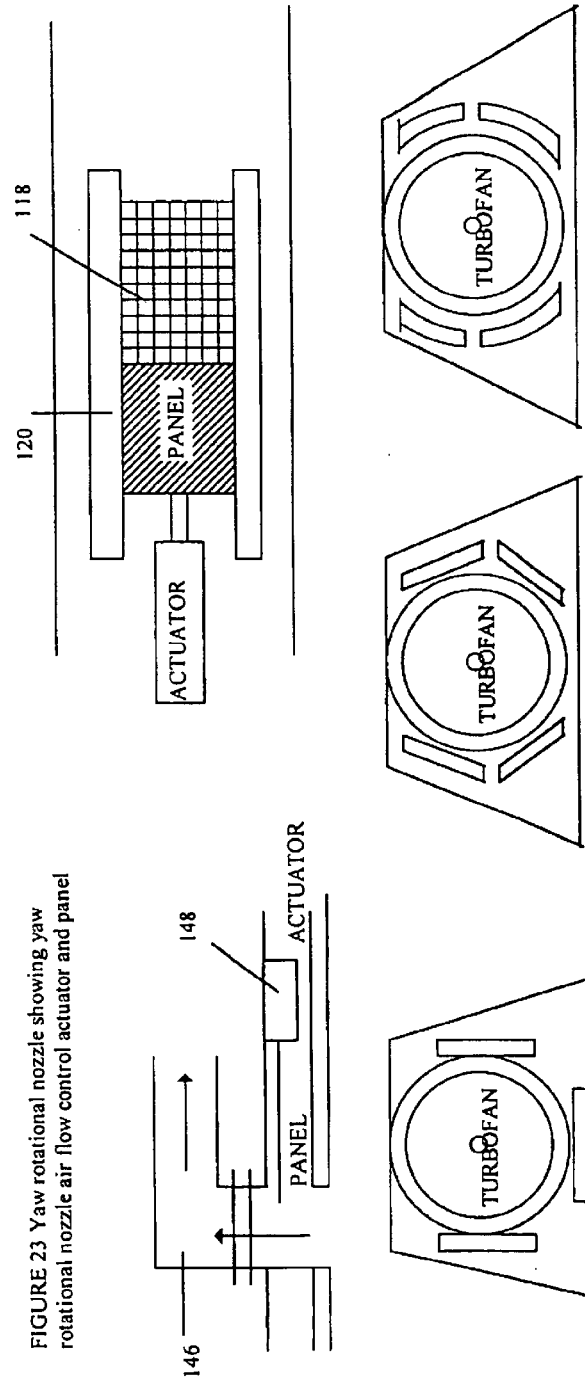
FIGURE 24 Solid sliding panel combined with 2D rotational vane system
FIGURE 23 Yaw rotational nozzle showing yaw rotational nozzle air flow control actuator and panel
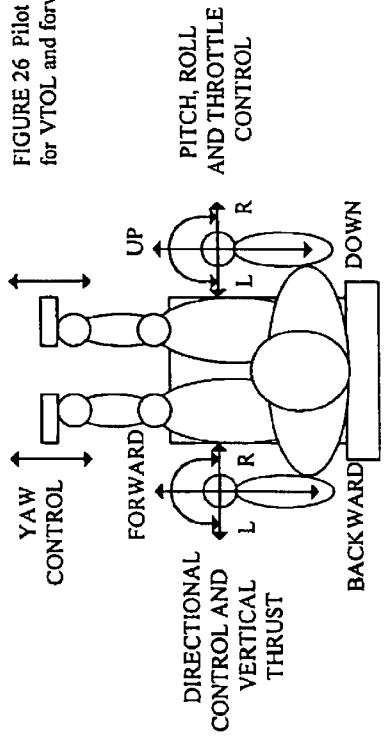
FIGURE 26 Pilot flight control inputs for VTOL and forward flight
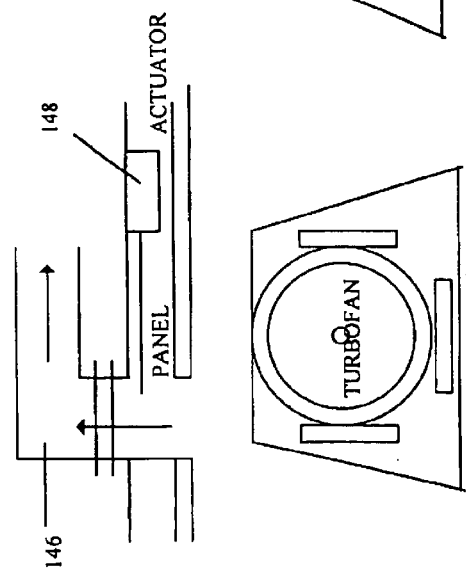
FIGURE 25 Cross section through the fuselage in line with the vertical thrust ducts of the VTOL internal duct propulsion system

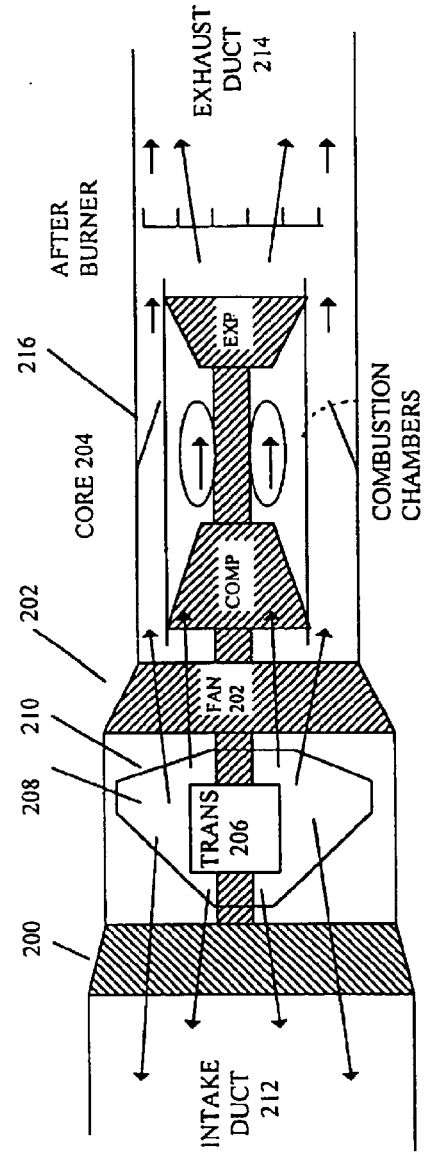
FIGURE 27 Schematic cross sectional diagram of the VTOL reversible rotation additional fan propulsion system showing air flow in the VTOL mode
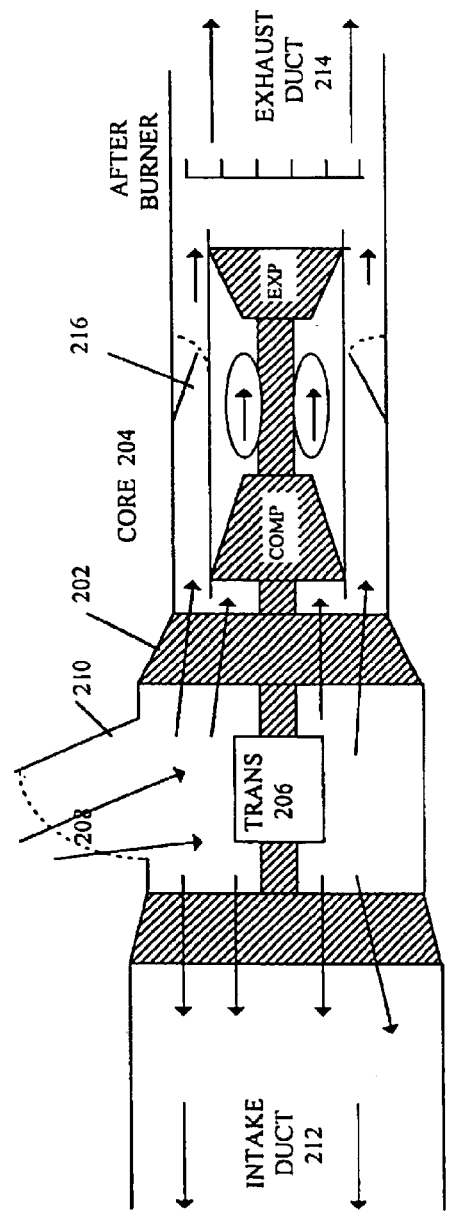
FIGURE 28 Schematic lateral cross sectional diagram of the VTOL reversible rotation additional fan propulsion system showing air flow in the VTOL mode

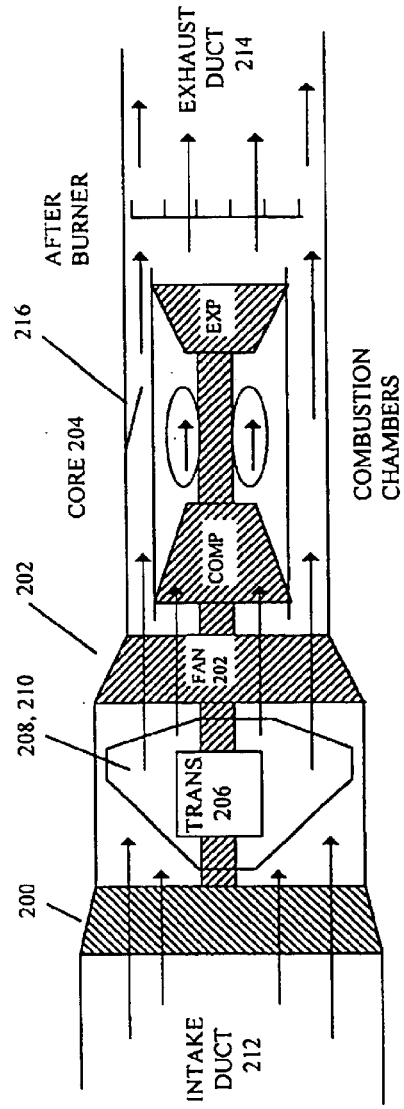
FIGURE 29 Schematic cross sectional diagram of the VTOL reversible rotation additional fan propulsion system showing air flow in the forward flight mode
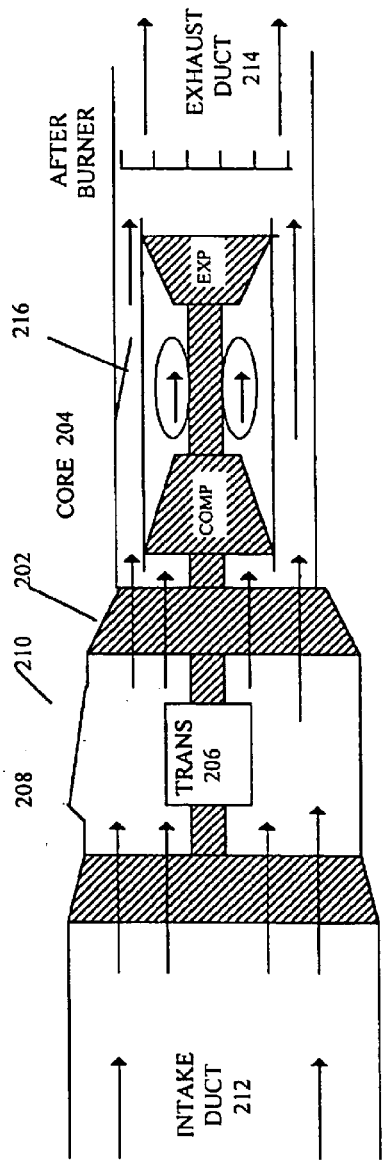
FIGURE 30 Schematic lateral cross sectional diagram of the VTOL reversible rotation additional fan propulsion system showing air flow during the forward flight mode

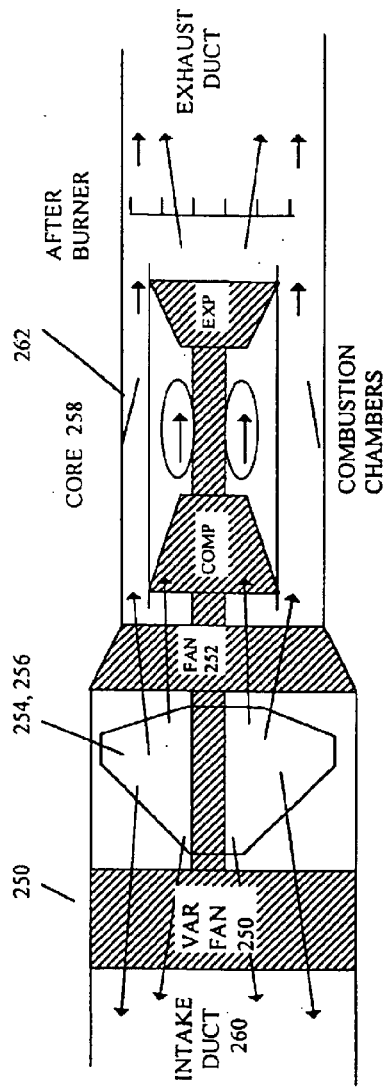
FIGURE 31 Schematic cross sectional diagram of the VTOL reversible pitch additional fan propulsion system showing air flow in the VTOL mode
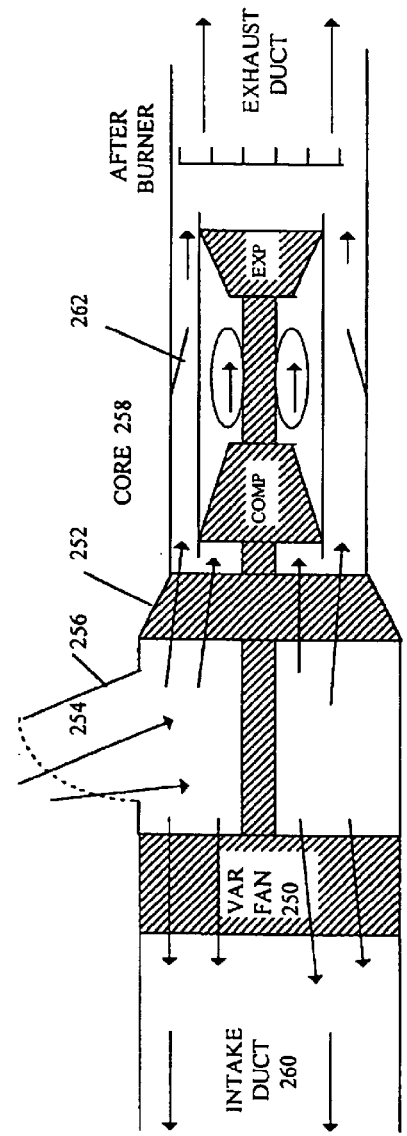
FIGURE 32 Schematic lateral cross sectional diagram of the VTOL variable pitch additional fan propulsion system showing air flow in the VTOL mode

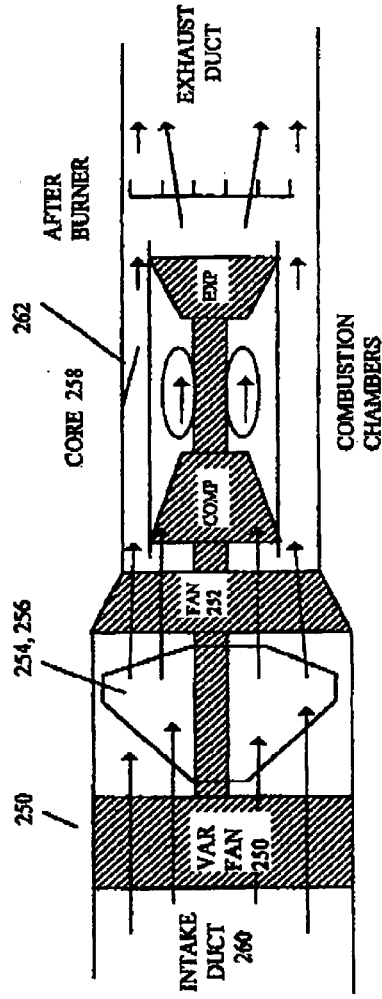
FIGURE 33 Schematic cross sectional diagram of the VTOL variable pitch additional fan propulsion system showing air flow in the forward flight mode
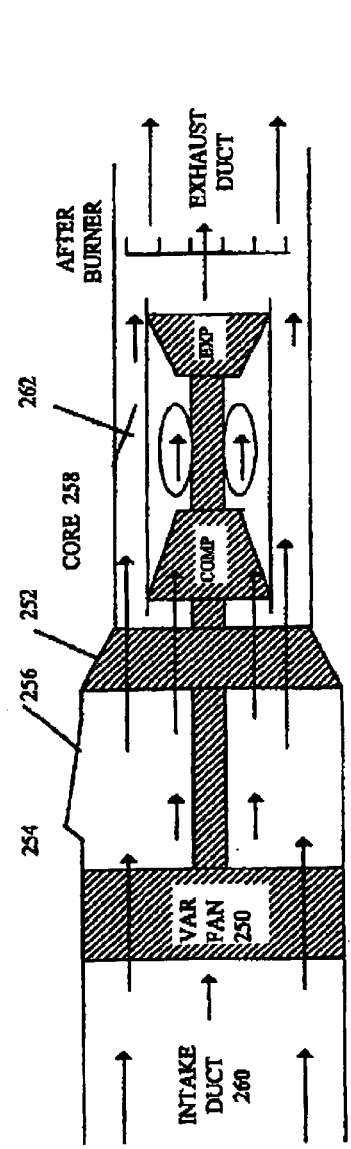
FIGURE 34 Schematic lateral cross sectional diagram of the VTOL variable pitch additional fan propulsion system showing air flow in the forward flight mode

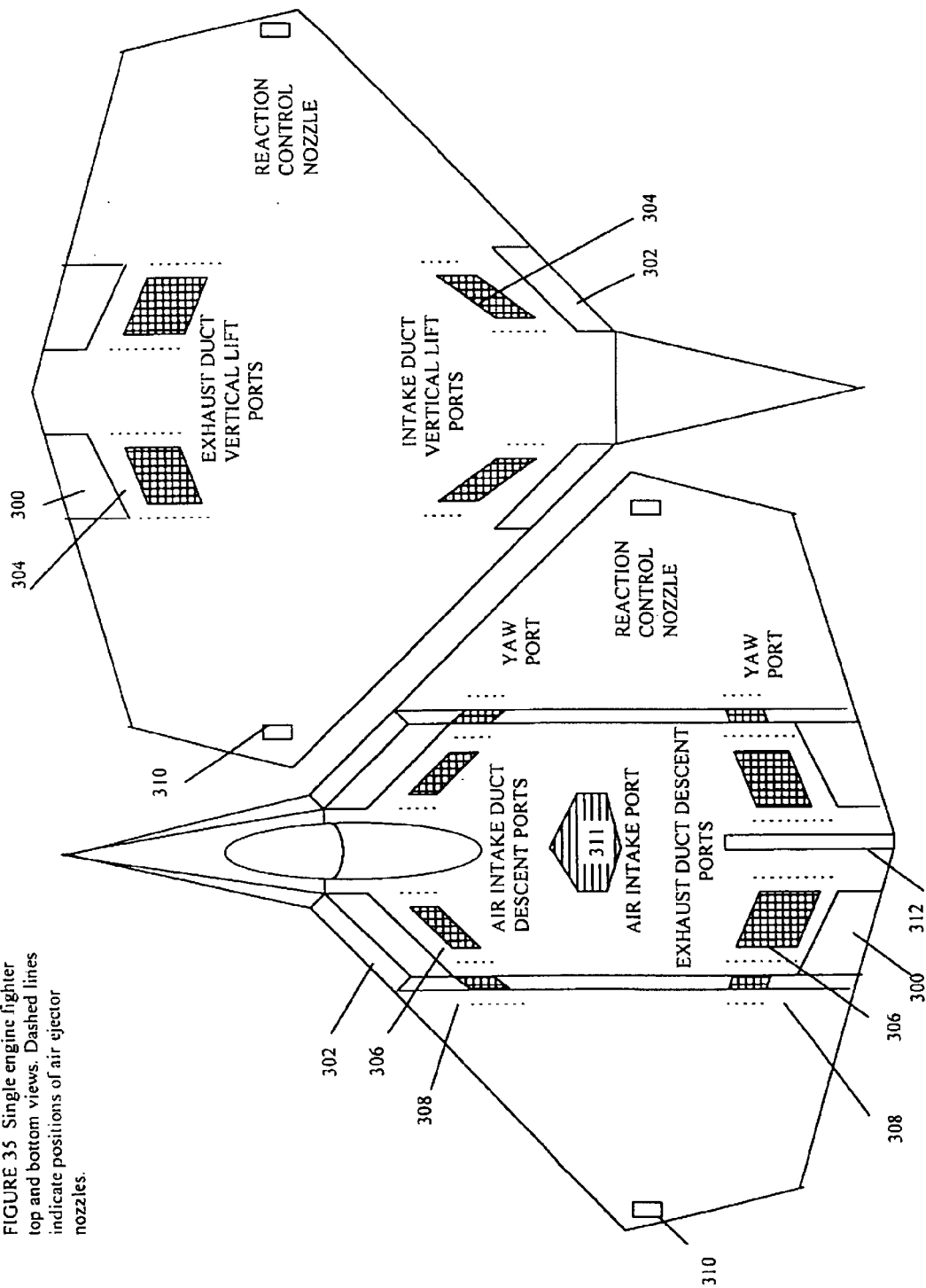
FIGURE 35 Single engine fighter top and bottom views. Dashed lines indicate positions of air ejector nozzles.

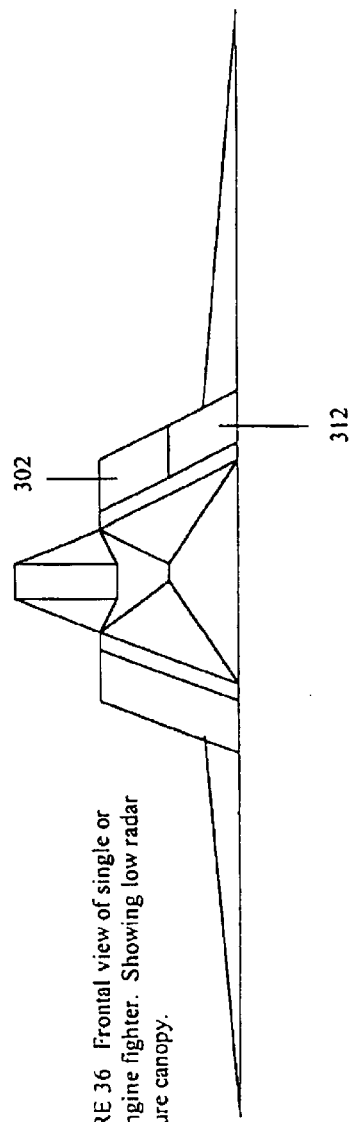
FIGURE 36 Frontal view of single or dual engine fighter. Showing low radar signature canopy.
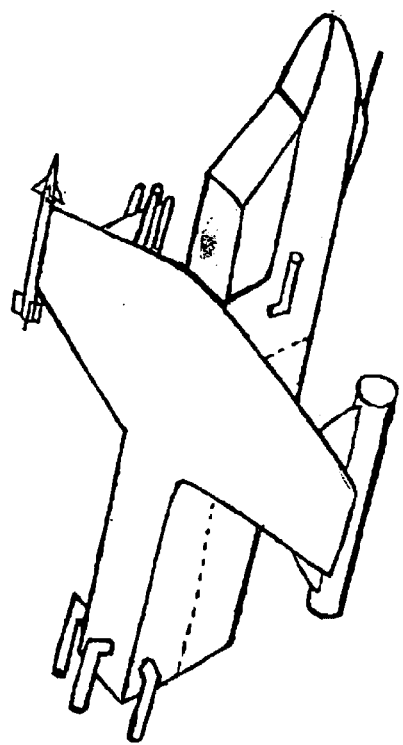
FIGURE 37 Combat aircraft having lateral rotational nozzles and yaw nozzle

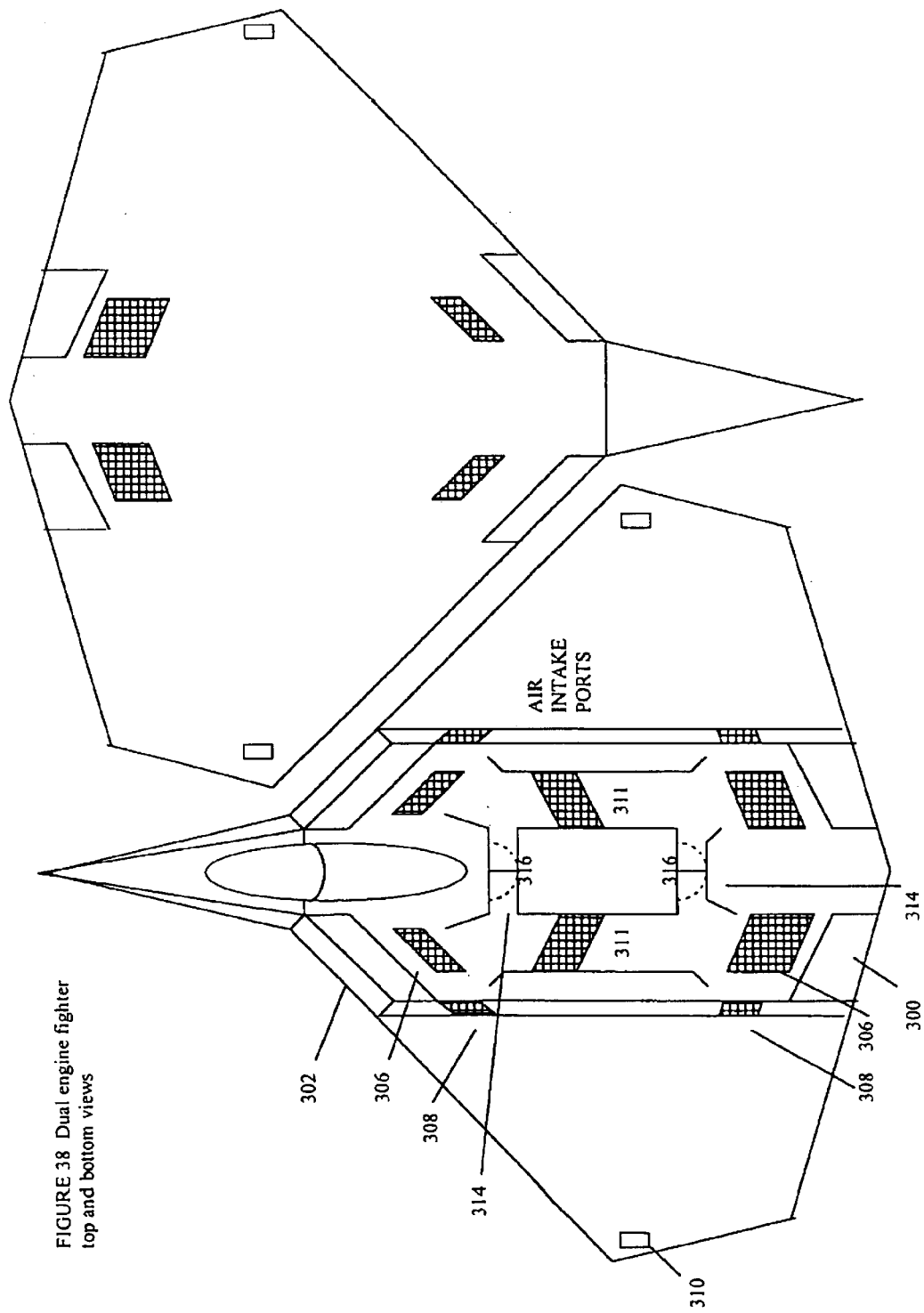
FIGURE 38 Dual engine fighter top and bottom views

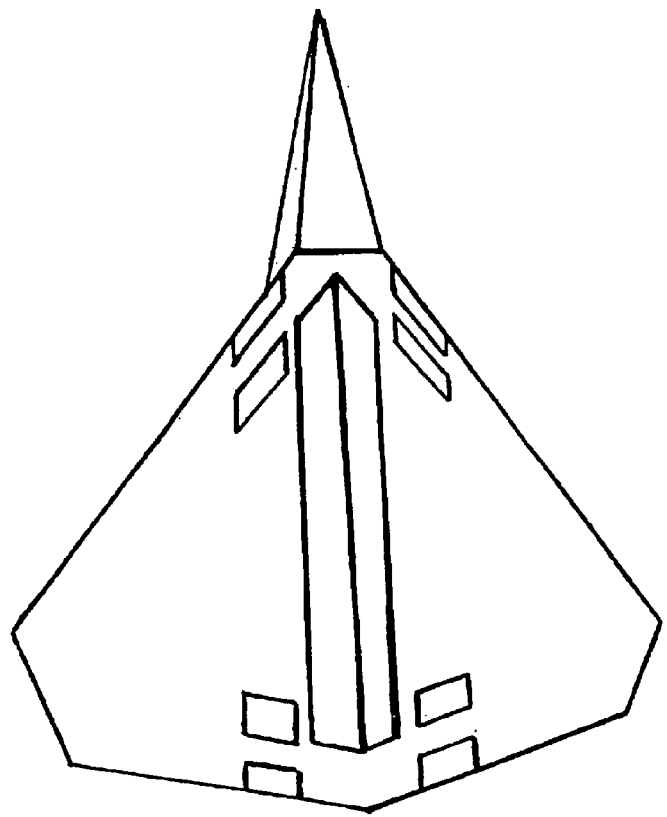
FIGURE 39 Approaching view of a dual engine fighter
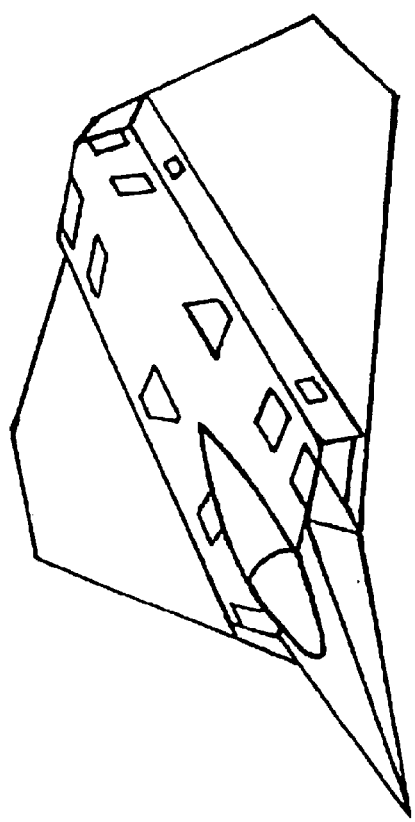
FIGURE 40 Bottom view of dual engine fighter turning away

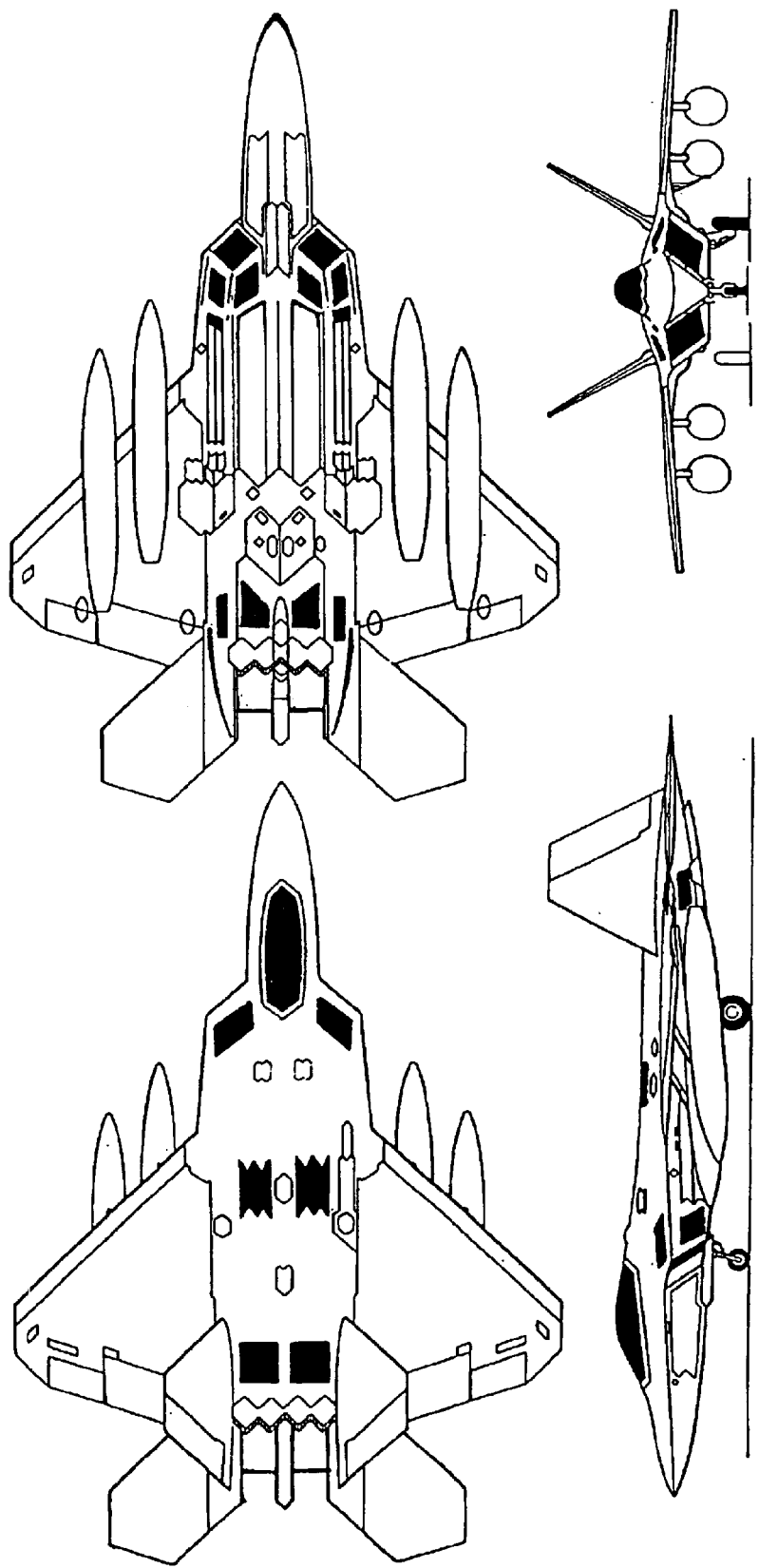
FIGURE 41 F-22 Raptor showing air intake ports, vertical lift ports, vertical descent ports, and yaw ports. Diagram modified from Jane's All the Worlds Aircraft.

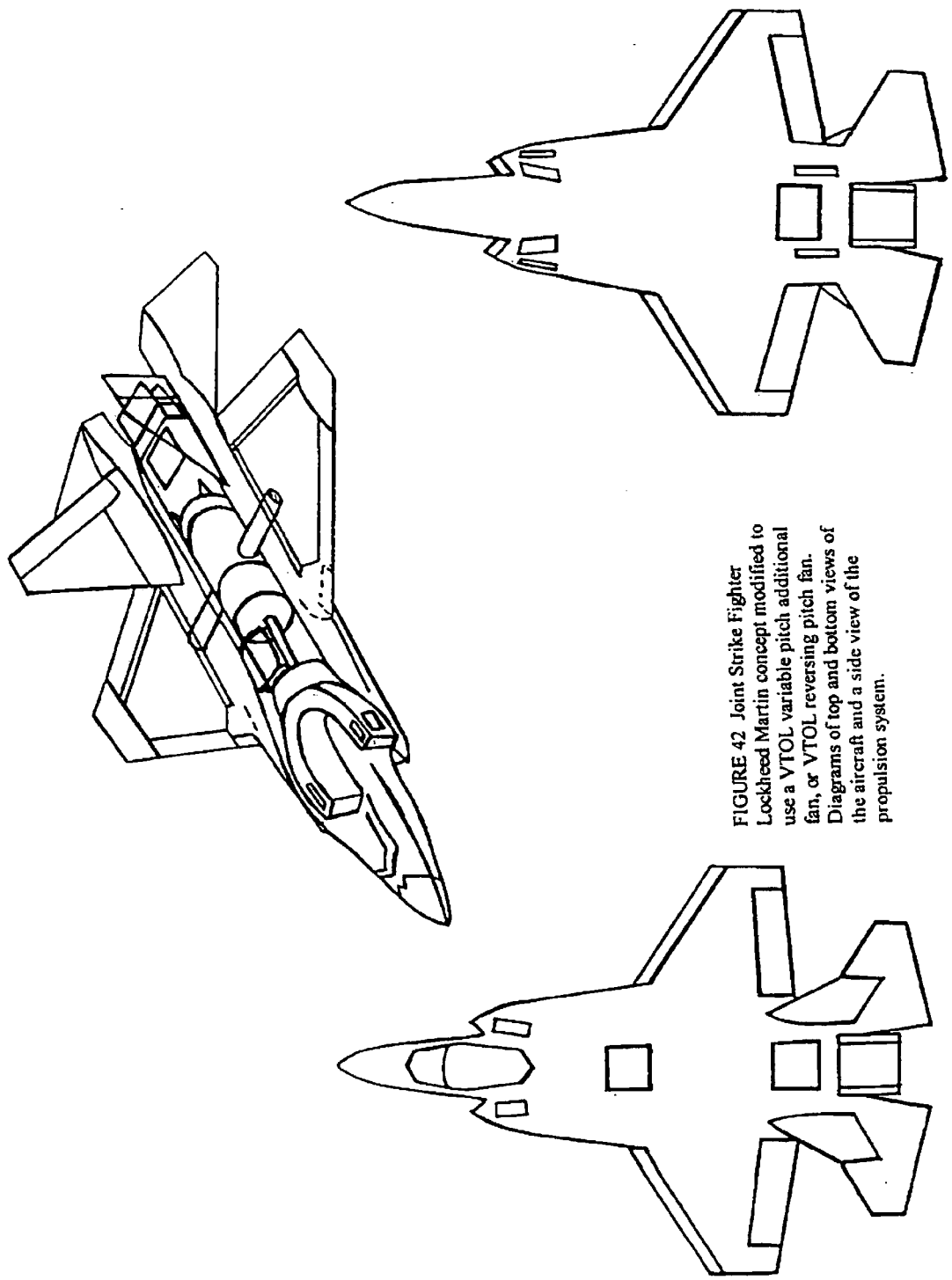
FIGURE 42 Joint Strike Fighter Lockheed Martin concept modified to use a VTOL variable pitch additional fan, or VTOL reversing pitch fan. Diagrams of top and bottom views of the aircraft and a side view of the propulsion system.

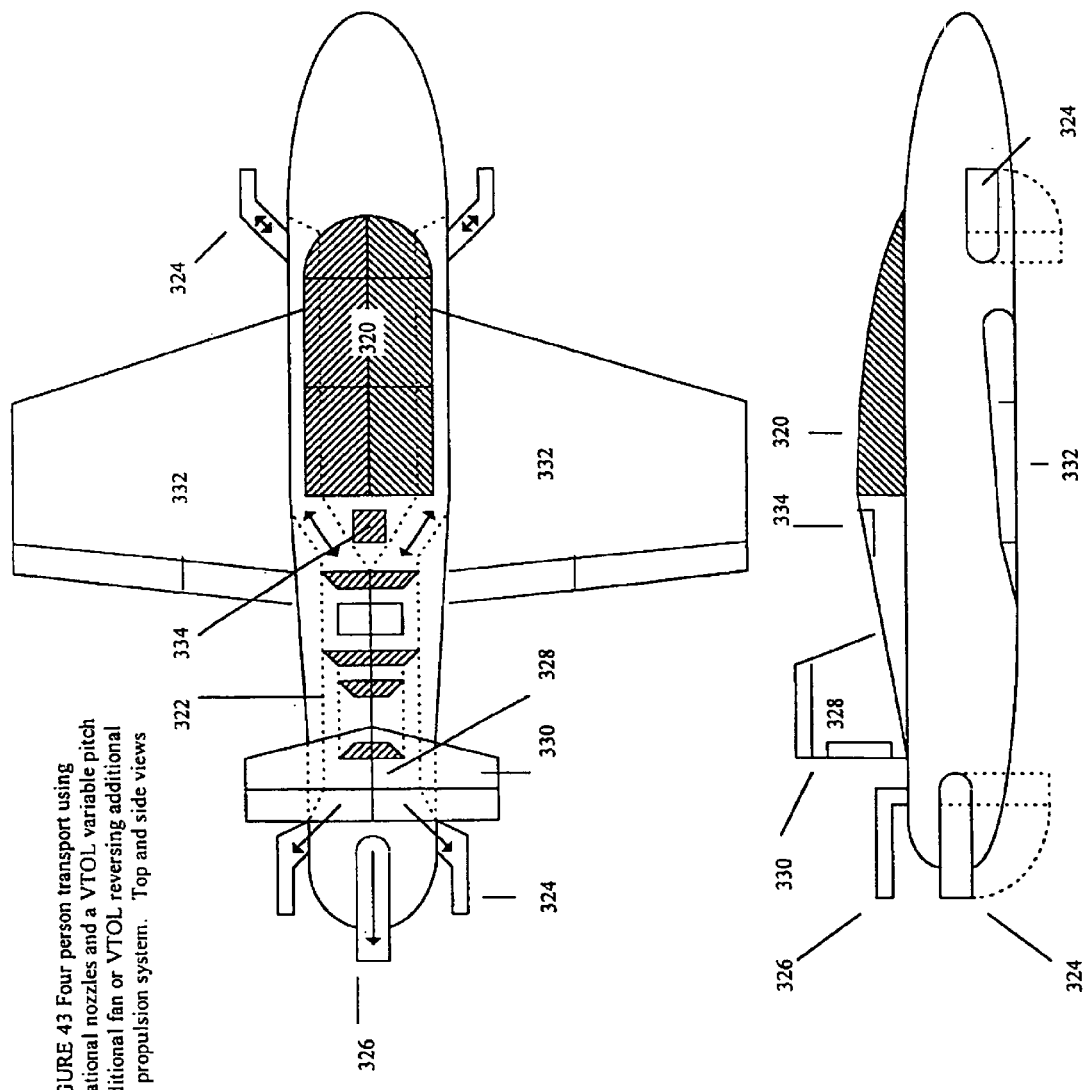
FIGURE 43 Four person transport using rotational nozzles and a VTOL variable pitch additional fan or VTOL reversing additional fan propulsion system. Top and side views

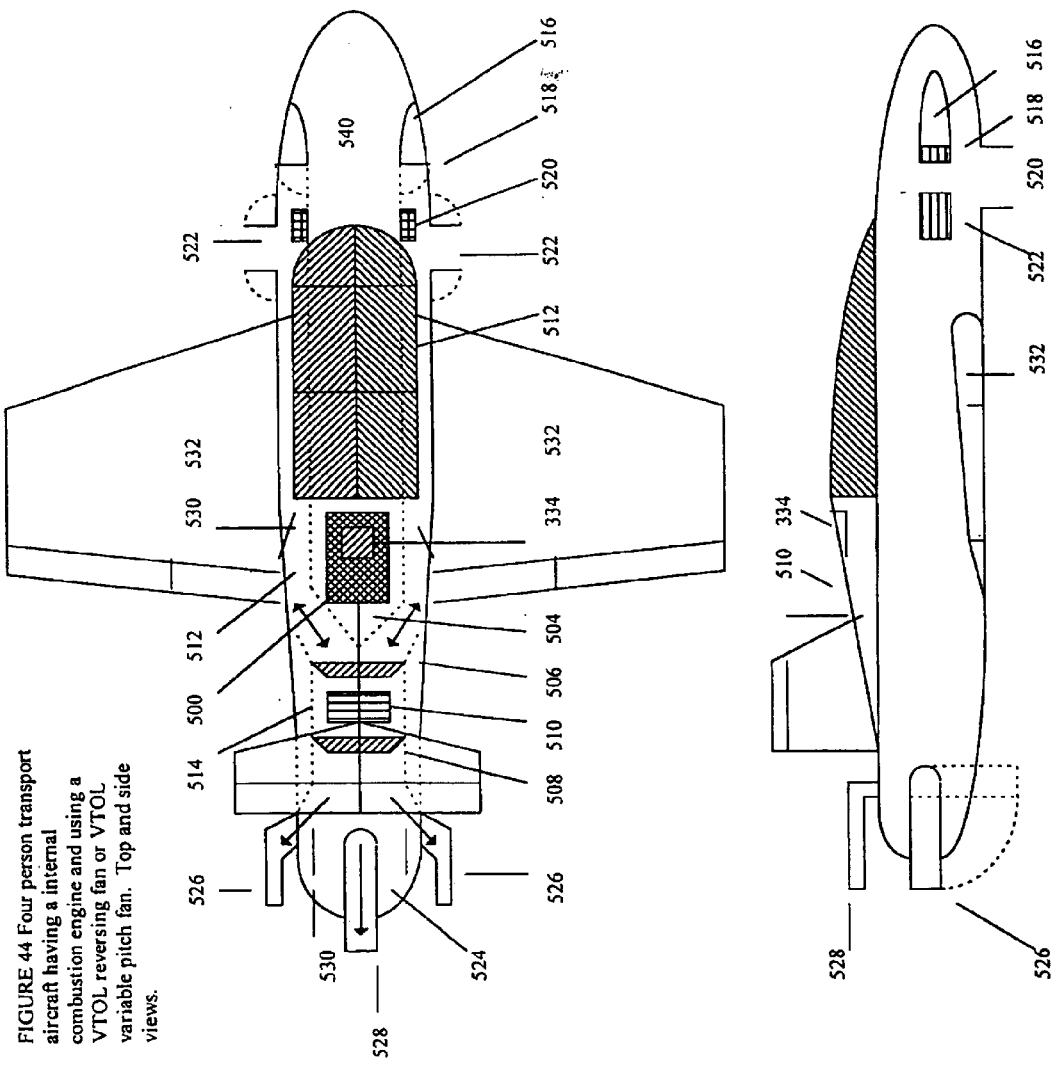

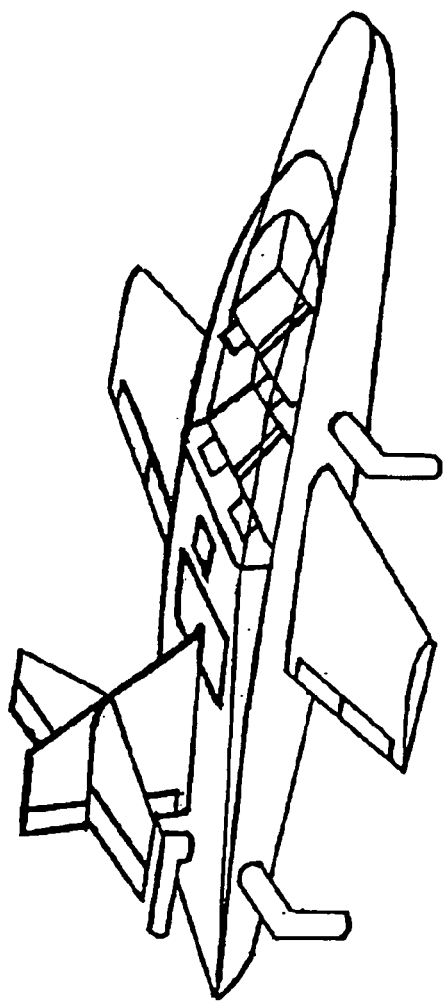
FIGURE 45 Side view of a four person VTOL aircraft showing lateral rotational nozzles and yaw nozzle.

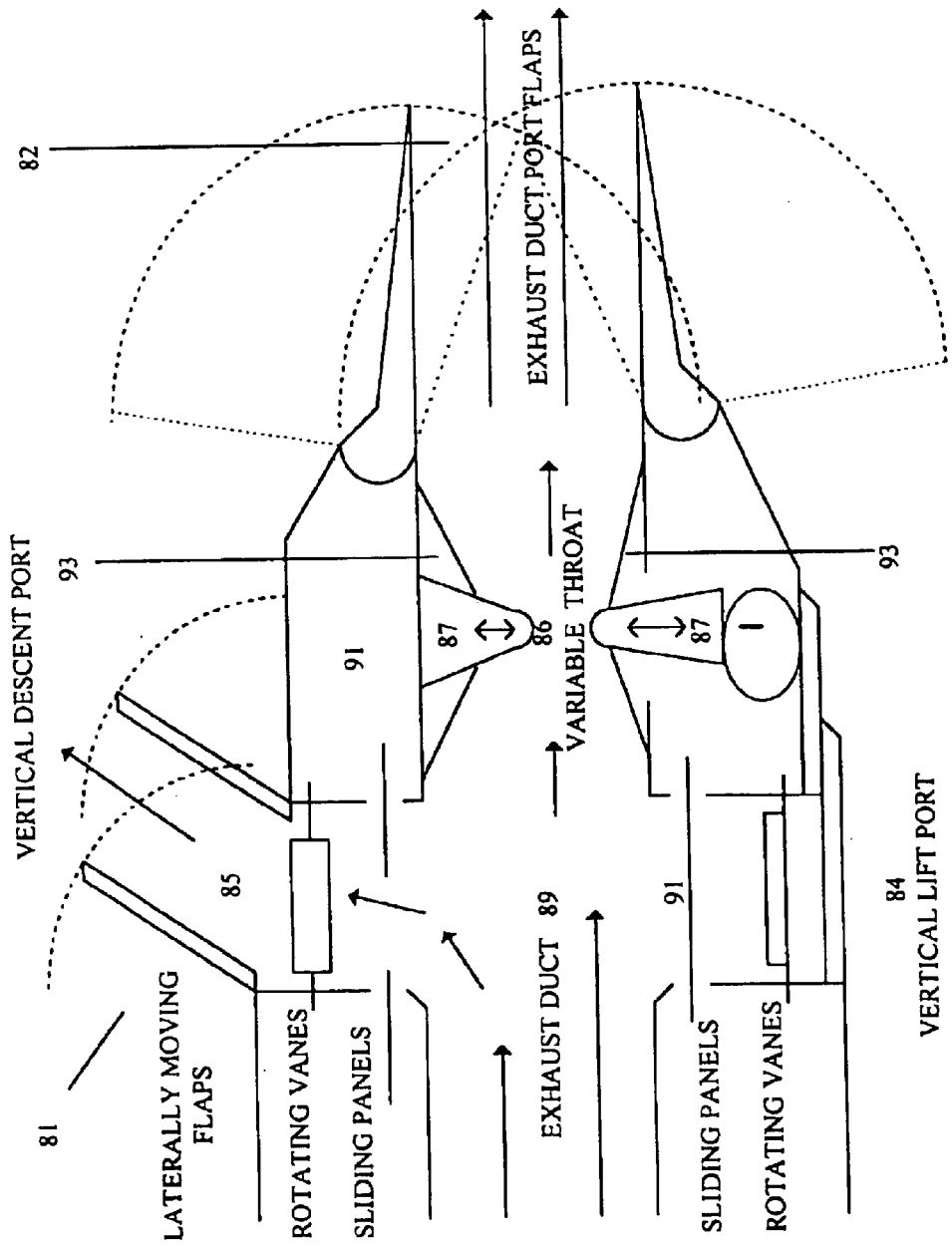
FIGURE 46 Cross section of exhaust duct thrust vectoring variable throat nozzle

VERTICAL TAKEOFF AND LANDING AIRCRAFT PROPULSION SYSTEMS

CROSS REFERENCE TO RELATED APPLICATIONS

This application claims the priority benefit of U.S. Provisional Application No. 60/312,761 filed on Aug. 17, 2001.

FEDERALLY SPONSORED RESEARCH

Not Applicable

SEQUENCE LISTING OR PROGRAM

Not Applicable

FIELD OF INVENTION

The present invention relates to Vertical Take-off and Landing ("VTOL") propulsion systems that create a forward flow of air in the air intake ducts and an aft flow of air in the exhaust duct. The forward flow of air in the intake duct and the aft flow of exhaust gases in the exhaust duct are vectored downward through ports that are opened by sliding panels or rotating valves. The port may have laterally moving flaps, rotational vanes, rotational nozzles, or combined systems on them. A variable throat converging diverging nozzle is described. The VTOL concept is applied to turbofan engine and a internal combustion engine. A pilot input control system for VTOL and forward flight is described.

BACKGROUND OF THE INVENTION

1. VTOL AIRCRAFT AND PROPULSION SYSTEMS

The conventional helicopter is a VTOL vehicle which has a limited forward speed and range.

The V-22 Osprey is a helicopter with a rotor that tilts forward. The rotor has a high radar, low light and noise signature.

The Harrier "Jump" jet (AV 8A) uses the Pegasus turbofan engine. Thrust is vectored by nozzles that rotate in unison. Speed is limited to slightly above the speed of sound and the aircraft has a high radar and infrared signature.

The Lockheed Martin Joint Strike Fighter (JSF) concept is described by Bevilaqua and Shumpert in U.S. Pat. No. 5,209,428 dated May 11, 1993. The Lockheed Martin JSF concept has a 3-bearing swivel duct, a variable nozzle, and lift fan. Bevilaqua and Shumpert do not describe a 3-bearing swivel duct or variable nozzle.

Bollinger in U.S. Pat. No. 5,275,306 dated Jan. 4, 1994 describes a aircraft with a horizontal lift fan driven by exhaust air. The description is similar to Bevilaqua and Shumpert in other respects.

Zimmerman in U.S. Pat. No. 3,972,490 dated Aug. 3, 1994 describes a tri-fan powered VSTOL aircraft that uses turbo-tip fans and has a horizontal lift fan in the nose of the aircraft.

The Boeing JSF concept is described by Burnham et al in U.S. Pat. No. 5,897,078 dated Apr. 27, 1999. The aircraft described has rotational lift nozzles near the center of the aircraft, the exhaust duct nozzle can be closed and the aircraft has yaw, pitch and roll nozzles that stabilize the aircraft in a hover. The aircraft uses a F-119 derivative engine, positioned near the air intake.

Snell in U.S. Pat. No. 4,038,818 dated Aug. 2, 1977 describes a gas turbine power plant that has a series flow when air from the fan enters the engine core and a parallel flow in which the fan-driven air flow does not enter the engines core.

Musgrove in U.S. Pat. No. 4,474,345 dated Aug. 2, 1984 describes a series parallel gas turbine power plant used in a VTOL aircraft.

Nightingale in U.S. Pat. No. 4,587,803 dated May 13, 1986 describes a series parallel turbo machine where a sliding sleeve changes flows into a variable cycle engine with a series and parallel flows.

Roberts in U.S. Pat. No. 5,107,675 dated Apr. 28, 1992 describes a series parallel gas turbine power plant using rotational nozzles that connect a forward fan to a aft turbofan engine.

Snell in U.S. Pat. No. 5,996,935 dated Dec. 7, 1999 describes power plants for VSTOL aircraft, in which the variable series parallel power plants described by Snell in 1977 is used in a VTOL aircraft. Snell describes a rotational nozzle system similar to Roberts, in which a forward fan drives air into rotational nozzles that can be connected to a aft turbofan. The rotational nozzles can also be closed by rotational valves and fan flow directed into a main turbofan engine. The VTOL fan is located forward in the aircraft to create a balance in a hover.

2. THRUST VECTORING COWLS, HOODS, BONNETS, AND CONDUITS

Sokhey et al in U.S. Pat. No. 5,769,317 dated Jun. 23, 1998 describes a segmented conduit with rotating vanes and flaps that control thrust vectoring.

Nash in U.S. Pat. No. 4,000,610 dated Jan. 4, 1977 describes a cowl, or deflector, that has a variable throat for a vertical takeoff and landing aircraft.

Adamson in U.S. Pat. No. 4,222,234 dated Sep. 16, 1980 describes a vectoring "lobster tail" nozzle that is a segmented hood.

Scrace in U.S. Pat. No. 4,660,767 dated Apr. 28, 1987 describes a cowl system similar to Nash.

Horinouchi in U.S. Pat. No. 4,587,804 dated May 13, 1986 describes the thrust deflector or hood that has a variable throat and is used to create vertical thrust.

3. THRUST VECTORING ROTATIONAL VANES

Thayer and Stevens in U.S. Pat. No. 4,805,401 dated Feb. 21, 1989 describes a thrust vectoring exhaust nozzle using rotational vanes. Thayer describes a system that maintains a minimum flow, or fluid discharge area for engine function, and vectors thrust through a plurality of rotational vanes.

Madden in U.S. Pat. No. 4,690,329 dated Sep. 1, 1987 describes a door and rotational vanes that reverse thrust of a turbofan engine. The invention has a method of closing the exhaust duct to force engine exhaust flows to exit through thrust reversing ports.

Garland in U.S. Pat. No. 4,948,072 dated Aug. 14, 1990 describes a cascade of rotational vanes to which can vector thrust and regulates opening of the port.

4. THRUST VECTORING FLAPS

Herrick, Thayer and Steward in U.S. Pat. No. 4,836,451 dated Jun. 6, 1989 describes a nozzle with a variable throat area that uses flaps and a gimbaled system. The nozzle throat can be closed and exhaust gases passed through ports on the sides of the exhaust duct. Exhaust gas flows through ports is used to reverse thrust and for thrust vectoring.

Meister in U.S. registration No. H1024 dated Mar. 3, 1992 describes a thrust vectoring and reversing structure with a rotating flap or vane in the exhaust duct flow.

Cockerham in U.S. Pat. No. 5,161,752 dated Nov. 10, 1992 describes a system having four ports that uses flaps to develop yaw and pitch control while maintaining engine back pressure by closing the exhaust nozzle.

Cockerham in U.S. Pat. No. 5,255,850 dated Oct. 28, 1993 describes a nozzle reverser assembly using flaps and having a exhaust nozzle that can be closed.

Holowach in U.S. Pat. No. 5,690,280 dated Nov. 25, 1997 describes a flap system on the exhaust duct that is capable of numerous exhaust gas exit configurations. The positioning of flaps within the exhaust flow would create a high infrared signature.

Lowman in U.S. Pat. No. 4,074,859 dated Feb. 21, 1978 describes a flap system to vector and reverse thrust. It's systems is somewhat similar to Holowach.

5. THRUST VECTORING VARIABLE NOZZLES

Nash in U.S. Pat. No. 4,175,385 dated Nov. 27, 1979 describes a variable throat thrust reversing exhaust nozzle with a cowl for vertical lift.

Beaver in U.S. Pat. No. 3,986,687 dated Oct. 19, 1976 describes a aircraft propulsion system having a flight reversible nozzle with thrust vectoring, super circulation and variable throat control.

Madden in U.S. Pat. No. 4,587,806 dated May 13, 1986 describes a variable throat asymmetric two-dimensional converging diverging nozzle for thrust vectoring and directing thrust vertically.

Nash in U.S. Pat. No. 4,361,281 dated Nov. 30, 1982 describes the exhaust nozzle that can be closed and has variable convertent divergent form but is not for thrust vectoring.

Wooten in U.S. Pat. No. 4,280,660 dated Jul. 28, 1981 describes a variable throat nozzle that can vector thrust up to 60 degrees.

Szuminski in U.S. Pat. No. 4,519,543 dated May 28, 1985 describes a rotatable duct that can turn a nozzle through 90 degrees to vector thrust down.

Taylor and Nash in U.S. Pat. No. 5,351,888 dated Oct. 4, 1994 describes a "multi-axis vectorable exhaust nozzle" for thrust vectoring.

6. ENGINE CONTROL

Neitzel in U.S. Pat. No. 4,791,781 dated Dec. 20, 1988 describes variable inlet and outlet guide vanes which lessen the outer load on the fan allowing power to be diverted to another fan or rotor.

Many of the patents mentioned have some engine control system to maintain minimum throat area and engine back pressures.

7. VARIABLE PITCH FANS

Dumbar in U.S. Pat. No. 5,794,432 dated Aug. 18, 1998 describes variable inlet, outlet and stator blades on a fan.

Griswold in U.S. Pat. No. 3,994,128 Nov. 30, 1976 describes a variable pitch turbofan system.

Avena in U.S. Pat. No. 4,047,842 dated Sep. 13, 1977 describes a variable pitch mechanism for fan blades.

McCarty in U.S. Pat. No. 5,282,719 dated Feb. 1, 1994 describes the pitch actuator system for a gas turbine engine.

SUMMARY OF THE INVENTION

This invention comprises vertical take off and landing (VTOL) propulsion system that have a forward flow of air through the intake ducts during vertical takeoff and landing. Air flow is directed forward through the intake ducts by (1) a internal duct system, with the fan rotating in one direction during forward flight and VTOL, (2) rotation of the fan one direction during forward flight and the opposite direction during VTOL, (3) a additional fan that is rotated in one direction during forward flight and in the opposite direction during VTOL, (4) a additional fan with variable pitch guide vanes, rotor and/or stator blades that move air backward in forward flight and forward during VTOL, (5) a primary fan with variable pitch guide vanes, rotor and/or stator blades that moves air backward in forward flight and forward during VTOL.

This invention comprises thrust vectoring systems for controlling aircraft direction, attitude, pitch, roll, yaw and rotation. These thrust vectoring systems are applied to the forward flow of air within the air intake duct, and the backward flow of gases from the turbofan engine during VTOL and forward flight. The air intake port and exhaust duct port are closed to direct air flows through ports. The opening of the ports is controlled by sliding solid or slotted panels. Thrust vectoring from ports is further controlled by laterally moving flaps, rotational vanes, or rotational nozzles. These thrust vectoring elements are combined to create systems that provide increased thrust vectoring control.

The thrust vectoring system on the vertical lift, vertical descent and yaw ports on each intake and exhaust duct operate independently but in a coordinated manner to control aircraft direction, attitude, pitch, roll, yaw, and rotation during VTOL and forward flight. A computerized system monitors pilot inputs, the amount of opening of each port and the position of thrust vectoring elements on ports. The computer independently controls the amount of opening of each port by moving sliding panels located on each port. The computer independently controls thrust vectoring elements on each port. This independent operation of thrust vectoring elements on each port increases control of the aircraft during VTOL and forward flight. The number of ports and therefore actuators and sensors may be reduced, four ports at 45 degrees may be used, or one vertical lift port on a the air intake duct and one vertical lift port on the exhaust duct may be used.

A variable converging diverging exhaust duct nozzle is described. The nozzle has throat plates that control the nozzle throat size. These throat plates are separate from exhaust duct flaps that vector thrust. The throat plates can be moved in a asymmetric manner to assist the exhaust duct flaps in vectoring thrust. The throat plates can be brought together to close the exhaust duct port.

Rotational nozzles are attached to ports these nozzles function in a independent but coordinated manner to provide aircraft control in VTOL and forward flight modes. Lateral rotational nozzles are located on the sides of the aircraft and yaw rotational nozzles are located on the upper and lower surface of the aircraft.

Burners may be located in the air intake ducts and the exhaust ducts to increase thrust during VTOL. The use of burners may be limited to situations where maximum payload and maximum fuel is required.

A movable radar absorbing or reflecting grid may be located in the air intake duct. The radar grid is movable to increase aircraft speed and engine efficiency when the aircraft is not operating in a threat situation. This radar grid could be applied to the Boeing JSF concept or the F-117 stealth fighter.

Air ejector nozzles are located around ports to prevent hot gases from damaging the aircraft. These air ejector nozzles are also placed strategically on the aircraft to prevent hot gases from returning to the aircraft and causing damage.

The pilot inputs control information through right and left handles, or sticks. The left handle controls the VTOL and forward flight mode, directional control and vertical thrust. The right handle controls aircraft attitude and throttle.

The VTOL propulsion systems and the thrust vectoring methods may be applied to a single engine fighter, a dual engine fighter, a combat aircraft with rotational nozzles, and a four passenger aircraft. The designs may reduce or eliminate the vertical and horizontal stabilizers and flight control surfaces. Application to UAV's is discussed.

The port locations on a aircraft similar in shape to the F-22 (Raptor) is shown.

A aircraft similar to the Joint Strike Fighter Lockheed Martin concept is shown with a variable pitch fan and variable thrust vectoring exhaust nozzle system.

The VTOL propulsion systems and thrust vectoring methods may be applied to a small passenger aircraft using a internal combustion engine. A internal duct VTOL propulsion system can be used with a internal combustion engine to develop a small UAV.

These VTOL propulsion systems can be used to reverse thrust and slow the aircraft during landing.

BRIEF DESCRIPTION OF THE FIGURES

FIG. 1 Cross sectional schematic view of a aircraft turbofan propulsion system

FIG. 2 Lateral cross sectional schematic view of a aircraft turbofan propulsion system FIG. 3 Cross sectional schematic view of a VTOL internal duct propulsion system showing air flow in the VTOL mode and the laterally moving flap thrust vectoring system.

FIG. 4 Lateral cross sectional schematic view of a VTOL internal duct propulsion system showing air flow in the VTOL mode and the laterally moving flap thrust vectoring system.

FIG. 5 Cross sectional schematic view of a VTOL internal duct propulsion system showing air flow in the forward flight mode and the laterally moving flap thrust vectoring system.

FIG. 6 Lateral cross sectional schematic view of a VTOL internal duct propulsion system showing air flow in the forward flight mode and the laterally moving flap thrust vectoring system.

FIG. 7 Independently operated laterally moving flaps

FIG. 8 Exhaust duct flap system and vertical lift and descent port operation for increased forward flight performance FIG. 9 Exhaust duct flap system and vertical lift and descent port operation for increased forward flight performance FIG. 10 Cross section of sliding panels of a duct FIG. 11 Sliding solid panel for port aperture control FIG. 12 Sliding slotted panel for port aperture control FIG. 13 Rotational vanes and sliding panels FIG. 14 Frontal view of the 2D rotational vane system FIG. 15 Cross section view of sliding panels with a 2D rotational vane system FIG. 16 Cross sectional view of a single rotational vane system combined with a laterally moving flap FIG. 17 Cross sectional view of a single rotational vane system combined with a laterally moving flap FIG. 18 Single rotational vane system combined with a sliding panel FIG. 19 Cross sectional schematic view of a VTOL reverse rotation fan propulsion system during the VTOL mode, using rotational nozzle thrust vectoring systems.

FIG. 20 Lateral cross sectional schematic view of a VTOL reverse rotation fan propulsion system during the VTOL mode, using rotational nozzle thrust vectoring systems.

FIG. 21 Cross sectional schematic view of a VTOL reverse rotation fan propulsion system during the forward flight mode, using rotational nozzle thrust vectoring systems.

FIG. 22 Lateral cross sectional schematic view of a VTOL reverse rotation fan propulsion system during the VTOL mode, using rotational nozzle thrust vectoring systems.

FIG. 23 Yaw rotational nozzle showing yaw rotational nozzle air flow control actuator and panel FIG. 24 Solid sliding panel combined with 2D rotational vane system FIG. 25 Cross section through the fuselage in line with the vertical thrust ducts of the VTOL internal duct propulsion system FIG. 26 Pilot flight control inputs for VTOL and forward flight FIG. 27 Schematic cross sectional diagram of the VTOL reversible rotation additional fan propulsion system showing air flow in the VTOL mode FIG. 28 Schematic lateral cross sectional diagram of the VTOL reversible rotation additional fan propulsion system showing air flow in the VTOL mode FIG. 29 Schematic cross sectional diagram of the VTOL reversible rotation additional fan propulsion system showing air flow in the forward flight mode FIG. 30 Schematic lateral cross sectional diagram of the VTOL reversible rotation additional fan propulsion system showing air flow during the forward flight mode FIG. 31 Schematic cross sectional diagram of the VTOL reversible pitch additional fan propulsion system showing air flow in the VTOL mode FIG. 32 Schematic lateral cross sectional diagram of the VTOL variable pitch additional fan propulsion system showing air flow in the VTOL mode FIG. 33 Schematic cross sectional diagram of the VTOL variable pitch additional fan propulsion system showing air flow in the VTOL mode FIG. 34 Schematic lateral cross sectional diagram of the VTOL variable pitch additional fan propulsion system showing air flow in the forward flight mode FIG. 35 Single engine fighter top and bottom views. Dashed lines indicate positions of air ejector nozzles.

FIG. 36 Frontal view of single or dual engine fighter. Showing low radar signature canopy.

FIG. 37 Combat aircraft having lateral rotational nozzles and yaw nozzle

FIG. 38 Dual engine fighter top and bottom views

FIG. 39 Approaching view of a dual engine fighter

FIG. 40 Bottom view of dual engine fighter turning away

FIG. 41 F-22 Raptor showing air intake ports, vertical lift ports, vertical descent ports, and yaw ports. Diagram modified from Jane's All the Worlds Aircraft.

FIG. 42 Joint Strike Fighter Lockheed Martin concept modified to use a VTOL variable pitch additional fan, or VTOL reversing pitch fan. Diagrams of top and bottom views of the aircraft and a side view of the propulsion system.

FIG. 43 Four person transport using rotational nozzles and a VTOL variable pitch additional fan or VTOL reversing additional fan propulsion system. Top and side views FIG. 44 Four person transport aircraft having a internal combustion engine and using a VTOL reversing fan or VTOL variable pitch fan. Top and side views.

FIG. 45 Side view of a four person VTOL aircraft showing lateral rotational nozzles and yaw nozzle.

FIG. 46 Cross section of exhaust duct thrust vectoring variable throat nozzle

DESCRIPTION OF THE INVENTION

A conventional turbofan engine depicted in FIGS. 1 and 2 has a fan (10), connected to a gas turbine core (2). The gas turbine core is composed of a compressor turbine (4), a expansion turbine (6), and combustion chambers (8). The fan (10), forces air into the gas turbine core (2), and around the gas turbine core (12). Turbofan engines are referred to as high, mid, and low bypass engines depending on the ratio of air that moves through the gas turbine core and around the gas turbine core.

Propulsion systems of VTOL aircraft direct the flow of air from the fan and core of a turbofan engine downward to produce lift. If the turbofan engine is located in the rear of the aircraft, air passes through air intake ducts to reach the engine. With the turbofan engine in the rear of the aircraft lift is developed behind the center of gravity of the aircraft. To balance the aircraft during VTOL lift is required near the nose. This invention uses the air intake ducts to move air forward to the nose of the aircraft, this airflow is directed downward to produce lift, and balance a VTOL aircraft.

VTOL INTERNAL DUCT PROPULSION SYSTEM (FIGS. 3, 4, 5 and 6)

This VTOL internal duct propulsion system is a duct system that diverts the flow of air from the fan forward into the intake duct during vertical takeoff and landing. During forward flight air flows into the air intake ducts (22), through the fan (10), and core (2). During vertical takeoff and landing a air intake port flap (16), on top of the aircraft engine, in front of the fan, opens allowing air to flow into a air intake port (14). The air intake port flap (16), can be formed from one or more flaps, and the flaps can move forward, backward, or laterally to open the air intake port. Rotational vanes, sliding solid or slotted panels, described within this writing, can also be used to open and close the air intake port. Intake duct flaps (18), are located forward of the fan (10), and the air intake port (14). During vertical takeoff and landing the intake duct flaps move to block the air intake ducts (22). With the intake duct flaps blocking the air intake ducts, all air entering the fan and the core enters through the air intake port (14).

Several vertical thrust ducts (20), leave the engine behind the fan (10). These vertical thrust ducts turn 180 degrees, and attach to the air intake duct (22), forward of the intake duct flaps (18). Along the vertical thrust ducts (20), are vertical thrust duct panels (30). These vertical thrust duct panels allow air flow through the vertical thrust ducts (20), during VTOL. The vertical thrust duct panels (30), close during forward flight preventing air from moving forward in the vertical thrust ducts. Located along the sides of the core (2), are core flaps (32). These core flaps restrict, and can completely block, air from the fan from flowing around the core during vertical takeoff and landing. With the core flaps (32) closed, air passing through the fan is forced into the core, or the vertical thrust ducts (20). During forward flight the core flaps are open allowing air from the fan to flow around the core. The core flaps (32), can be located at the end of the core where they function to equalize flows from the fan and the core, similar to mixers. The vertical thrust duct panels (30), can be moved toward the core to reduce flows of air around the core and deflect air into the vertical thrust ducts.

The air moving forward in the intake ducts is directed downward by thrust vectoring methods using laterally moving flaps, sliding solid or slotted panels, rotating vanes, rotational nozzles, or a combination of these methods.

THRUST VECTORING (FIGS. 7 and 8, 19, 20, 21, 22)

In this invention air moving forward in the air intake ducts and air moving aft in the exhaust ducts pass through lateral ports to leave the aircraft. The lateral ports point upward (vertical descent ports or VDP), downward (vertical lift ports or VLP), and laterally (yaw ports). If there are two intake ducts and two exhaust ducts, each duct has one vertical descent port pointing upward, one vertical lift port pointing downward, and one yaw port pointing laterally. If there is a single intake duct or exhaust duct then these ducts have one vertical descent port, one vertical lift port and two yaw ports, one pointing to the right and the other to the left. The air flowing forward in the air intake ducts and the exhaust flowing backward in the exhaust ducts is forced to leave through the lateral ports by closing the end of the intake ducts and exhaust ducts.

The lateral ports are opened by sliding solid or slotted panels. These solid, or slotted panels also control the amount of opening, or throat size, or aperture size of the lateral ports. The total aperture size of all the ports is important in controlling turbofan engine function. A minimum total throat size is required under current operating conditions. The total throat size controls back pressure in the intake and exhaust ducts. The back pressure in the intake and exhaust ducts controls the turbofan engine function.

The air flow from the lateral ports has a thrust vector defined by the direction that the port faces. The thrust vector angle is further refined by using laterally moving flaps, or rotational vanes, or a combined system.

To maximize thrust in forward flight and create a exhaust nozzle that has a throat that can be closed a convergent divergent nozzle with throat plates is described.

Air flowing through the vertical thrust ducts (20), and entering the air intake ducts (22), is directed downward to produce vertical lift. The forward facing opening of the air intake duct (22), termed the air intake duct port (34), is closed by the air intake duct port flap (36), during vertical takeoff and landing. On the bottom of the air intake duct (22), is the air intake duct vertical lift port (38). The amount of opening of the air intake duct vertical lift ports is controlled by the sliding air intake duct vertical lift port panels (40). The sliding air intake duct vertical lift port panels control the aperture, or throat size (41), of the vertical lift port. The air intake duct vertical lift port panels may be a single panel or two panels. If two panels are used the malfunction of one panels actuator can be overcome by the continued function of the second panel. During forward flight the air intake duct port is open and the air intake duct vertical lift port is closed. During vertical takeoff and landing the intake duct port is closed and the air intake duct vertical lift port is open. The downward air flow from the air intake duct vertical lift port generates thrust that lifts the aircraft vertically.

The flow of air from the fan, passing around the core, and the flow of combustion products from the core, is directed downward by the closure of the exhaust duct ports (46), by the exhaust duct port flaps (42), and the opening of the exhaust duct vertical lift ports (44), by the movement of the exhaust duct vertical lift port panels (48). The size of the throat (49), or aperture, created by the exhaust duct vertical lift port panels alters the total throat area through which engine gases exit. For a engine operating under specific conditions a minimum total throat area, or minimum opening of aircraft ports is required. The opening of ports is monitored and controlled so that the minimum total throat area is available for the sufficient flow of gases through the engine under the engines current operating conditions.

With laterally moving independently operated flaps located in front of (52), and behind (54), the port, the direction of the air flowing from the port can be controlled.

The flaps can be moved toward the center of the port (56), to cover the port. If the flaps are swiveled forward (58), thrust is directed forward, and the aircraft is driven backward. If the flaps are swiveled backward (60), thrust is directed backward, and aircraft is driven forward. If the flaps are both moved towards each other (62), the flow from the port is restricted and lift and thrust decreases.

In most cases the laterally moving flaps, on vertical lift ports, will move backward and forward to direct the thrust from the vertical lift port backward or forward. The flaps may be linked and movement accomplished by a single actuator. The forward thrust generated by the backward directed laterally moving flaps, on the vertical lift ports, is used to develop a forward flight velocity sufficient for wing generated lift.

The flow through the intake duct vertical lift ports (38), is controlled by the opening and closing of the core flaps (32), the vertical thrust duct panels (30), and the vertical lift port panels (40). If the vertical thrust duct panels are fully opened and the core flaps are closed, maximum air flow is directed into the vertical thrust ducts and the air intake ducts. By controlling lift generated by the intake duct vertical lift ports and the exhaust duct vertical lift ports aircraft pitch (nose up or down) control is established during VTOL. The sliding vertical lift port panels control the amount of opening (aperture or throat size) of the vertical lift ports. The vertical lift port panels are used to control lift generated by the intake duct and exhaust duct vertical lift ports. The intake and exhaust duct vertical lift ports operate independently but in a coordinated manner to control vertical movement of the aircraft, and aircraft attitude (pitch).

If the aircraft has two intake ducts and two exhaust ducts, as shown in diagrams, lift is generated at four points. Four points of vertical lift, or thrust, is more stable than two or three points of vertical lift, or thrust. The VTOL propulsion systems described in this writing can be used with an aircraft design that has two or three vertical lift ports. If the air intake duct vertical lift port panels (40), and the exhaust duct vertical lift port panels (50), are closed (aperture or throat size decreased) on the right side of the aircraft, and opened (aperture or throat size increased) on left side of the aircraft, the aircraft rolls to the right. Controlling the thrust generated by the vertical lift thrust ports on each side of the aircraft establishes roll control during VTOL, and during flight. The intake and exhaust vertical lift ports on each side of the aircraft are operated independently but in a coordinated manner to effect aircraft attitude (roll).

Yaw control is established by movement of yaw control panels (66), which open, close, and control the aperture size, or throat size, of yaw control ports (68), located on the sides of the intake and exhaust ducts. Opening the yaw control port on the left side of the exhaust duct and opening the yaw control port on the right side of the intake duct will cause the aircraft to rotate while in a hover. Opening both yaw control ports on one side of the aircraft causes the aircraft to move laterally, or sideways, toward the opposite side. Yaw control ports are operated independently but in a coordinated manner to control aircraft yaw, rotation and lateral movement.

Vertical descent ports (70), are located on top of the engine, or aircraft, above the intake duct vertical lift ports and the exhaust duct vertical lift ports. The opening, closing, and aperture size, or throat size, of the vertical descent ports is controlled by the sliding movement of port panels. These vertical descent ports (70), control aircraft pitch and roll during vertical takeoff and landing, and during forward flight. Air from the fan, and combustion products from the core, leaving the exhaust duct vertical descent ports, generates a downward force at the tail of the aircraft causing the nose of aircraft to pitch upward. This downward force on the tail of the aircraft increases the rate of turn of the aircraft during forward flight. The roll of the aircraft during forward flight is controlled by opening the exhaust duct vertical descent port on the right side of the aircraft, and opening the exhaust duct vertical lift port on the left side of the aircraft, as a result the aircraft rotates to the right.

Opening the vertical descent ports of the intake and exhaust ducts during a hover decreases lift generated by the vertical lift ports. This decreased lift lowers the aircraft to the ground. Lift generated by the vertical lift ports can also be decreased by opening the intake duct ports and exhaust duct ports. The opening of the exhaust duct ports, while in a hover, moves the aircraft forward. The opening of the intake duct ports, while in a hover, moves the aircraft backward. Opening the exhaust duct, or intake duct port, on one side of the aircraft while the other exhaust duct, or intake duct port on the other side of the aircraft remains closed during a hover causes the aircraft to rotate.

The opening and closing of the exhaust duct vertical lift ports, exhaust duct vertical descent ports and exhaust duct yaw control ports, at the tail of the aircraft, during forward flight enhances aircraft flight performance. A forward air flow in the intake duct during forward flight can be used to create additional thrust vectoring forces acting near the nose of the aircraft.

The forward flow of air in the intake duct is developed by
opening the air intake port (34),
moving the air intake duct flaps (18), to block the air intake ducts,
opening the vertical thrust duct (20),
closing the core flaps (32)
closing the air intake duct ports (34), by moving the air intake duct port flaps.

The forward flow of air in the intake duct can be developed while the aircraft is in forward flight. Air from the fan (10), passing through the vertical thrust ducts (20), and intake ducts (22), is used by a thrust vectoring system on the air intake duct (22), to move the nose of the aircraft. The vectored thrust acting on the nose of the aircraft, increases the effects of vectored thrust acting at the tail of the aircraft.

The vertical lift ports, vertical descent ports and yaw control ports are opened and closed in responds to the pilots input. A computerized system gives priority to maintaining vertical thrust, the remaining air flows are used to generate thrust in a manner corresponding to the pilots inputs. The computer control system continuously monitors the position of elements of the thrust vectoring system. The amount of opening, aperture or throat size, of the vertical lift, vertical descent, yaw, intake and exhaust ports is monitored and controlled so that total throat aperture area is greater than the minimum total throat area required for engine operation under current operating conditions.

The amount of opening, aperture or throat size, of ports on the engine, or aircraft, is controlled by sliding panels (76). When laterally moving flaps on the external surface of the aircraft extend outward during forward flight they engage air flowing past the fuselage. The pressure of air acting against the laterally moving flap provides a directional thrust, in addition to, the vectored thrust produced by gases leaving the port.

The sliding panels that control the amount of port opening maintain a streamlined air flow over the fuselage, and have less of a radar signature than laterally moving flaps. The actuators of the sliding panels are located under the skin of the aircraft's fuselage. The sliding port panels controlling the aperture, or throat size, of the port, can be used to vector thrust without using laterally moving flaps, or rotational vanes on the port. The port panels move to control the port throat size and compensate for movements of laterally moving flaps and rotational vanes.

A exhaust duct thrust vectoring system (81), having a variable convergent divergent nozzle for maximum forward flight performance, has independently operated exhaust duct port flaps (80), located on the top and bottom of the exhaust duct duct port (82). To increase the directional control of the flow of gases, guide plates (83), are located on the sides of the exhaust port flaps. The exhaust duct thrust vectoring system (81), uses the vertical lift (84), and vertical descent ports (85), to develop additional thrust vectoring. The independently operated exhaust duct port flaps (80), can vector exhaust upward or downward, and develop converging and diverging nozzle forms. Within the exhaust duct the throat of the variable convergent divergent nozzle (86), is made variable by the movement of throat plates (87), located on the sides of the rectangular exhaust duct (89). The throat plates (87) can move into the exhaust duct until they touch, closing the exhaust duct port. With the exhaust duct port closed, by the throat plates, gases must leave the exhaust duct through the vertical lift, vertical descent or yaw ports. The movement of air from the vertical lift, vertical descent or yaw ports is controlled by the movement of sliding port panels (91). Throat plate panels (93), are attach by hinges to the top of the throat plates smoothing the flow of gases passing through the throat of the converging diverging nozzle formed. The end of the throat plate panels (87), is held against the wall of the exhaust duct as the throat plates extend and retract. The end of the throat plate panels is keyed to fit into slots that hold, and guide, the throat plates as they slide along the wall of the exhaust duct. The throat plate panels may be attached by hinges to the rectangular exhaust duct wall with the movement of the throat plates moving the throat plate panels. The throat plates may be replaced by a round cylinder mounted off center or various cam shapes. These round forms may lie under the throat plates and be used to extend and retract the throat plates. The throat plates may move into the exhaust duct in an asymmetric manner to develop a asymmetric diverging nozzle that vectors gases leaving the nozzle throat. The throat plates may be moved by conventional hydraulic or electric actuators.

The upward movement of both exhaust port flaps (88), creates upward thrust driving the tail of the aircraft down, and pitching the nose of the aircraft up. The downward movement of both exhaust port flaps (90), creates a downward thrust driving the tail of the aircraft upward, and pitching the nose of aircraft downward. As the angle of the exhaust port flaps increases, the opening, between the exhaust port flaps decreases (92), restricting air flow. The opening of the throat (86), is adjusted, by moving the throat plates (87), as the angle of the exhaust duct flaps (80), is altered. To maintain and increase the vectored thrust generated by exhaust flows from the exhaust duct nozzle system (78), the exhaust duct vertical descent ports (94), or the exhaust duct vertical lift ports (95), are opened. When the exhaust port flaps (80), move upward the exhaust duct vertical descent port opens maintaining gas flow and forcing the tail of the aircraft downward, causing the nose of the aircraft to pitch upward, thereby increasing the aircraft's rate of turn. The exhaust flow from the engine is not restricted by the high angle of the exhaust duct port flaps (80), when the vertical descent ports (94), are opened, and higher angles of vectored thrust are generated. During vectored thrust maneuvers the total area of opening of all ports must be great enough to allow the engine to have sufficient flow to maintain stable engine operation under current operating conditions. The total area of opening of all ports controls the back pressure in the exhaust duct. Total area of port openings falls between a minimum for stable engine operation and a maximum area that generates sufficient back pressure within the exhaust duct. During VTOL the back pressure within the intake duct, exhaust duct, and around the core is controlled and balanced to maintain stable engine operation.

During vertical takeoff and landing the exhaust port flaps (80), can be brought together (96), or the throat plates (87), can be brought together to block exhaust gases from leaving the exhaust duct port, all gases must then leave the engine through the vertical lift ports (97), developing maximum lift.

Intake duct port flaps on top and bottom of the intake duct port can be brought together to block air from flowing out of the intake duct port in the VTOL mode. It is not necessary for a converging diverging nozzle form to be generated within the air intake duct therefore throat plates are not placed within the intake duct. These intake duct port flaps can be used to direct air flows into the air intake duct during forward flight.

Sliding panels are solid (98), or slotted (100). A slotted panel moves a shorter distance for a given increase in opening. For a given area of port opening a slotted panel is longer than a solid panel. One or two sliding panels may be used on one port. Two panels allow some directional flow control and malfunction of one actuator can be compensated for by the movement of the other panel.

Laterally moving flaps, solid sliding panels and slotted sliding panels can be combined with a cascade of rotational vanes (102). A cascade or rotational vanes consist of the number of rotational vanes (102), that are connected so that all rotational vanes rotate together. With the rotational vanes rotated in a horizontal plane (104), relative to the mounting frame, all air flow through the port is blocked. With the rotational vanes rotated vertically (108), relative to the mounting frame, air flow is directed at ninety degrees to the mounting frame, and air flow is at a maximum. With the rotational vanes rotated at 45 degrees (110), a downward air flow is directed forward or backward, or alternatively laterally (right or left). Rotational vanes are not used to control the amount of opening (aperture or throat size) of ports. Rotational vanes are used for directional control of thrust leaving a port. The sliding port panels control port aperture size. The sliding port panels move to compensate for changing throat size caused by movement of rotational vanes and laterally moving flaps.

One rotational slotted vane system can be laid over another at ninety degrees (112), to form a two directional (2D) rotational vane system. This 2D rotational vane system can direct a downward flow of air from a vertical lift port forward, backward or laterally (side to side).

Rotational vane systems (114), may be combined with laterally moving flaps (116). With the lateral moving flap directing air flows forward or backward and the rotational slotted vane system directing air flows from side to side, a greater control of thrust vector angle is developed. A cascade of rotational panels increases the efficiency of laterally moving flaps in directing air flow out of the port. In most applications the lateral flaps direct port air flows forward or backward, and the rotational vanes direct port air flows laterally (on vertical lift and descent ports), or up and down (on yaw ports). Sliding port panels control the amount of port opening, or port aperture size.

Rotational vane systems (118), may be combined with a sliding panel, or sliding slotted panel (120), that control the opening and amount of opening, or throat size, of the port. The sliding panel controls air flow out of a port that points in a particular direction, the rotational vanes apply forward, backward or lateral direction to the flow, increasing thrust vectoring control. On a yaw port a upward, downward, forward or backward direction of flow can be developed. By combining laterally moving flaps and rotational vanes with port control panels that control the amount of port opening, the infrared signature of the ports is reduced.

The application of a lateral moving flaps, sliding solid panels, sliding slotted panels, rotational vane systems, or combinations, to a particular port is dependent on design considerations of a particular aircraft and its application.

Four ports facing at angles of 45 degrees may be used to provide pitch roll and yaw control using described sliding panel port opening control and thrust vectoring laterally moving flaps or rotational vanes.

The flaps, sliding panels, or rotational vanes are moved by electrical or hydraulic actuators and associated mechanisms similar to those currently used for activating flight control surfaces.

VTOL REVERSING FAN ROTATION PROPULSION SYSTEM (FIGS. 27, 28, 29 and 30)

The VTOL reversing fan rotation propulsion system has a transmission (122), located between the fan (124), and the core (126). The transmission has forward and reverse gears, and can have multiple gear ratios, or speeds. Above the transmission, between the core and the fan, on the upper surface of the engine, or aircraft, is the air intake port (128). During forward flight the air intake port flaps (130), cover the air intake port (128), and air enters the engine through the air intake ducts (132). During vertical takeoff and landing the air intake port flap (128), moves to open the air intake port. Air entering the air intake port moves forward through the fan and backward through the core. To move air forward through the fan the direction of fan rotation is reversed. During vertical intake and landing a clutch is engaged, and the transmission gears are shifted into reverse to reverse the rotation of the fan, the core continues to rotate in the same direction as in forward flight. To prevent exhaust from the engine core from moving forward along the sides of the core during VTOL, core flaps (134), are closed around the sides of the core. The core flaps are open during forward flight.

The air flowing forward from the fan, and backward from the core is directed through the vertical lift, vertical descent or yaw ports. The various ports having sliding panels associated with them that control the opening, and amount of opening of the port. A minimum opening is required for stable operation of the engine under certain operating conditions. The total opening of all ports on the exhaust duct determines back pressure on the engine. The total opening of all ports on the intake duct determines back pressure on the fan.

The expansion turbine of the core extracts work from the expanding exhaust gases leaving the combustion chambers. The rotation of the expansion turbine rotates a shaft that is connected to the compressor and fan. In forward flight the fan compresses air entering the core, and the core operates at a high pressure. During forward flight the engine functions in a series mode of operation. During vertical takeoff and landing the fans rotation is reversed to drive air forward into the intake ducts. During VTOL the fan does not drive air into the core, and the core operates at a lower pressure. During VTOL the engine functions in a parallel mode. When the core operates at a lower pressure the amount of work developed by the expansion turbine is reduced. The thrust generated during vertical takeoff and landing is less than the thrust generated during forward flight. This reduction in VTOL thrust reduces the take off weight of the aircraft, and the aircraft's payload capacity. The lower payload capacity can be compensated for by using the aircraft in a short takeoff and landing mode, and by using in flight refueling. In flight refueling reduces the weight of a fuel lifted during vertical takeoff and landing. The reduced weight of fuel lifted increases the payload that can be lifted. The total opening (throat size) of exhaust duct ports is decreased to compensate for the decreased gas flow through the core during VTOL. The total opening (throat size) of the exhaust duct port is increased when afterburners are used.

The fan of a turbofan engine is designed to generate thrust in forward flight when the fan is rotated in one direction. The VTOL reversing fan propulsion system has a fan designed to provide a functional performance when the fan is operating in reverse. The factors involved in determining the fans design depends on the aircraft's performance requirements. Compromises in the performance of the fan during forward flight may, or may not be made, to produce greater thrust when the fan is rotated in reverse. Various fan structures with multiple rows of blades may be used.

The fans direction of rotation can be reversed during forward flight to establish a forward flow of air in the intake duct. This involves opening the air intake port, engaging a clutch to remove the fan from the core, shifting the transmission into reverse and releasing the clutch to connect the fan to the core. A braking mechanism can be included to stop the fan before the clutch is released. Thrust vectoring from the intake duct ports is used to enhance thrust vectoring from the exhaust duct and increase forward flight performance.

ROTATIONAL NOZZLES

Lateral rotational nozzles (136), can be placed on the sides of the intake duct and exhaust duct. These lateral rotational nozzles have flow control flaps, or sliding panels, located on the wall of the intake or exhaust duct. A rotating valve, similar to a solid or slotted panel, can be used to control flow through the rotational nozzle. These flow control flaps or panels determine the amount of opening (aperture or throat size) of the port leading into the lateral rotational nozzle. The intake duct lateral rotational nozzles face forward in forward flight and downward during vertical takeoff and landing.

Rotational nozzles (136), have a sealed joint (138), that can be rotated through 360 degrees. To reduce drag, and increase air flow, air passing through the intake and exhaust ducts enters the rotation joint at a angle. During forward flight the intake duct lateral rotational nozzles point forward (140), and the exhaust duct lateral rotational nozzles point backward (142). During vertical flight the intake and exhaust duct lateral rotational nozzles point downward.

The lateral rotational nozzles on the intake duct increase engine performance during forward flight. When the aircraft is turning the air intake duct ports do not face directly into the aircraft's movement through the air. As a result air is not rammed directly into the air intake ports and turbulence develops in the air intake duct. With rotational nozzles on the air intake duct the opening of the air intake duct rotational nozzle is rotated so that air is rammed directly into the air intake duct during a turn. The increased air flow into the engine increases engine performance.

During forward flight the exhaust duct lateral rotational nozzles control aircraft pitch by vectoring thrust upward or downward. The exhaust duct lateral rotational nozzles control aircraft roll during forward flight by, having the lateral rotational nozzle on one side of the aircraft point up and the lateral rotational nozzle on the other side of aircraft point down. When the flow control flaps, or panels, on the lateral rotational nozzle on one side of the aircraft is closed and the flow control flaps, or panels, on the lateral rotational nozzle on the other side of the aircraft is opened a yaw control force is developed.

Yaw control is also developed by placing a rotational nozzle on the top, and/or the bottom, of the exhaust duct and intake duct. These yaw control rotational nozzles (146), can rotate through three hundred and sixty degrees. When the exhaust yaw rotational nozzle at the tail of the aircraft points to the right the tail of the aircraft is pushed to the left. The air flow into the yaw rotational nozzle is controlled by a yaw rotational nozzle control panels, rotational valves, or flaps (148). The yaw rotational nozzle control panels slides over the opening to the yaw port (147), controlling the flow of air into the yaw rotational nozzle. With the flow to the lateral rotational nozzles of the intake duct and the exhaust duct closed, all air is forced to flow through the yaw rotational nozzles providing yaw control forces.

During vertical takeoff and landing the lateral rotational nozzles point downward generating lift. The lateral rotational nozzles are rotated forward, or backward, to move the hovering aircraft forward, or backward. The pitch of the aircraft is controlled by increasing or decreasing air flow through the lateral rotational nozzles of the intake duct relative to the exhaust duct. Lateral rotational nozzle control flaps, or panels, within the exhaust ducts (144), and intake ducts (150), control air flow through the lateral rotational nozzles. The roll of the aircraft can be controlled by increasing air flow through lateral rotational nozzles on one side of the aircraft relative to the other side of the aircraft. This involves opening the lateral rotational control flaps or panels (150), and the exhaust duct lateral rotational control flaps or panels (144), on one side of the aircraft and closing these control flaps or panels on the other side of the aircraft. Moving the yaw rotational nozzles (146), on the intake duct to the right and the yaw rotational nozzle on exhaust duct (146), to the left causes the aircraft to rotate about its center while in a hover.

The lateral rotational nozzles and yaw rotational nozzles operate independently of each other to create the movement input by the pilot, priority is given to maintaining vertical thrust.

Rotational nozzles can rapidly decelerate a aircraft during forward flight.

During landing VTOL propulsion systems with thrust vectoring can be used to reverse engine thrust to reduce landing distances.

VTOL REVERSING ADDITIONAL FAN PROPULSION SYSTEM (FIGS. 31–34)

The reversing additional fan propulsion system has a additional fan (200), located in front of the primary fan (202), and the core (204). Between the additional fan (200), and the primary fan (202), is a transmission (206). The transmission has forward and reverse gears that allow the additional fan to rotate forward and backward (clockwise or counter clockwise). On the upper surface of the engine or aircraft between the additional fan (200), and primary fan (202), is a air intake port (208). During forward flight the air intake port is covered by the air intake port flaps (210), and the rotation of the additional fan (200), drives air into the primary fan and core, increasing air compression and thrust. During forward flight the engine functions in a series mode. During vertical takeoff and landing the air intake port (210), is open and the additional fan (200), rotates in the opposite direction to its rotation in forward flight. During VTOL the additional fan draws air through the air intake port (208), and drives air into the air intake duct (212). During vertical takeoff and landing the primary fan and the core rotate in the same direction as during forward flight and air is expelled into the exhaust duct (214). During VTOL the engine functions in a parallel mode.

The exhaust turbine of the core extracts work from the expanding VTOL gases leaving the combustion chambers. The rotation of the exhaust turbine rotates a shaft, or shafts, that are connected to the compressor, the primary fan (202), transmission (206), and additional fan (200). The expansion turbine generates the work that drives the primary fan and the additional fan. In forward flight the primary fan and the additional fan drive air into and around the core, and the engine functions in a series mode. With air compression from both the primary fan (202), and the additional fan (200), the core operates at a higher pressure. During vertical takeoff and landing the additional fan drives air into the intake duct (212), and not into the primary fan (202), and core, and the engine functions in a parallel mode. Without air compression from the additional fan the core operates at a lower pressure. Not as much work is extracted by the expansion turbine when the core is operating at a lower pressure, and the core is not able to generate as much work during vertical takeoff and landing.

A turbofan engine that generates 35,000 pounds of thrust, may have a additional fan and transmission coupled to it. When the additional fan drives air into the turbofan engine, a higher compression is generated in the turbofan engine and increased thrust is generated during forward flight. In forward flight, over 45,000 pounds of thrust may be generated. This increased thrust translates into a higher cruise speed, and greater acceleration. During VTOL the additional fan and turbofan engine function in parallel, the additional fan rotation is reversed and the air entering the core is compressed by the primary fan alone. The exhaust turbines extract work from exhaust gases leaving the combustion chambers. The work extracted by the exhaust turbine drives, or turns, the compressor, primary fan, and additional fan. The work extracted by the exhaust turbine is split between the primary fan and additional fan. To increase the work available to drive the additional fan during VTOL, work done by the primary fan is reduced by partially closing the core flaps (216). The partially closed core flaps creates a back pressure that reduces the work being done by the primary fan. The turbofan engine continues to generate 35,000 pounds of thrust with 10,000 pounds of thrust being generated by the additional fan and 25,000 pounds of thrust being generated by the primary fan and core. The 10,000 pounds of lift generated by thrust vectoring systems on the intake duct, and the 25,000 pounds of thrust generated by the thrust vectoring systems on the exhaust duct, balances the aircraft during VTOL.

The total opening, or total throat size, of exhaust duct ports is decreased during VTOL, as compared to forward flight. The opening of the exhaust duct ports regulates back pressure within the exhaust duct.

Air flowing forward from the additional fan into the intake duct, and air flowing backward from the primary fan and core, produces thrust that is vectored in a direction determined by the direction that the port faces. The thrust vectoring of gases leaving the port is further refined by laterally moving flaps, rotational vanes, or rotational nozzles.

VTOL ADDITIONAL VARIABLE PITCH FAN PROPULSION SYSTEM

In this configuration shown in FIGS. 31, 32, 33 and 34, the direction of rotation of a additional fan (250), remains the same and the pitch of the rotor and/or stator blades of the fan is changed to drive air forward or backward. Between the additional fan (250), and the primary fan (252), is a air intake port (254). The air intake port can be opened, or closed, by the air intake port flap (256). During forward flight the pitch of the blades of the additional fan (250), drives air into the primary fan (252), and core (258), and the engine functions in the series mode. During vertical takeoff and landing the air intake port (254), opens and the pitch of the blades of the additional fan (250), is changed so that the additional fan drives air into the air intake ducts (260), and the engine functions in the parallel mode.

During forward flight more thrust is generated by the engine as the variable pitch fan drives air into the primary fan and core. During vertical takeoff and landing less thrust is generated. During VTOL the core flaps (262), are extended to reduce work done by the primary fan and provide work to rotate the additional fan. The total opening of ports on the exhaust duct is decreased in the VTOL mode, to maintain back pressure in the exhaust duct. The total opening of the ports on the exhaust duct is maintained above the minimum required for engine operation.

The additional fan may have several rows of variable pitch rotor and stator blades. The guide vanes may be variable. Rows of counter rotating propellers or blades may be used.

A variable pitch fan may reverse air flow within the air intake duct rapidly compared to a additional fan that reverses its direction of rotation. This is due to the variable pitch fan not having to be stopped and reversed. The pitch of the fans blades is changed, while maintaining the momentum of the fan's rotation. This ability to rapidly engage the VTOL variable pitch fan propulsion system during forward flight, and reverse the air flow within the air intake ducts, allows thrust vectoring forces acting near the nose of the aircraft to be generated during forward flight. Thrust vectoring forces from the air intake duct thrust vectoring ports, acting on the nose of the aircraft, enhances thrust vectoring forces from the exhaust duct ports, acting at the tail of the aircraft.

VTOL VARIABLE PITCH PRIMARY FAN PROPULSION SYSTEM

The primary fan may a have variable pitch rotor and/or stator or blades. A air intake port is located between the core and the primary fan. The air intake port is open during vertical takeoff and landing and closed during forward flight. During vertical takeoff and landing the variable pitch primary fan pushes air forward into the air intake ducts. During forward flight the variable pitch primary fan pushes air backward into or around the core. Diagrammatically the vertical takeoff and landing variable pitch fan propulsion system is similar to the vertical takeoff and landing reversible primary fan propulsion system, therefore separate diagrams are not included.

The core of the vertical takeoff and landing variable pitch primary fan propulsion system operates at a lower pressure in the vertical takeoff in landing mode than in the forward flight mode. The core extracts less work from the exhaust gases during the vertical takeoff landing mode then the forward flight mode. Core flaps located around the core prevent exhaust gases leaving the core from moving forward along the sides of core during VTOL. Total opening of the ports of the exhaust duct is decreased in VTOL mode to maintain back pressure in the exhaust duct.

PILOT FLIGHT CONTROL SYSTEMS

Stable flight is established by yaw, roll and pitch control. During a hover a aircraft has movement in three axes, rotation about the center of aircraft, and a aircraft attitude. Movement in three axes consists of vertical movement (up and down), forward and backward movement, and sideways (left and right) movement. Using thrust vectoring systems the aircraft can be moved in any direction. During movements the aircraft has a attitude described by pitch (nose up or down) and roll (left or right). The aircraft can also rotate about its center. In a hover the aircraft's attitude is usually level or parallel to the ground. When the aircraft is parallel to the ground in a hover and the aircraft rotates, the direction the nose of the aircraft points changes.

The pilot inputs control to the aircraft using his hands and feet. A helicopter has a stick that the pilot uses to input pitch and roll control, the foot pedals input yaw control, raising a lever arm provides vertical control inputs, and throttle control is obtained by rotating the handle of the lever arm. The Harrier STOVL aircraft has a stick that the pilot uses to input pitch and roll control, a lever controls the angle of the lateral rotational nozzles. The rotational nozzles are all moved in unison to the angle selected by the pilot. Another lever provides the pilot with throttle control. This invention has sliding panels and flaps and/or rotational vanes or rotational nozzles on ports. Each ports thrust vectoring components operate independently, to create the movement corresponding to the pilots input. A computer system controls and monitors the position of elements of the various thrust vectoring components on the ports of the aircraft.

The thrust vectoring systems described here can separate directional control and attitude control. Attitude control (pitch and roll) during vertical takeoff and landing, and forward flight, is maintained by a right stick, or handle control, that is moved by the pilots right hand. This right handle functions similar to existing systems used for forward flight. Rotation of the right handle also controls the throttle. The pilots left hand is used to control the direction of the aircraft's movement. This left stick, or handle, locks in a forward position. With the left stick, or handle, locked in this forward position the aircraft propulsion system functions in the forward flight mode. When the left stick, or handle, is pulled back from this forward locked position the aircraft propulsion system is switched into the vertical takeoff and landing mode, in which a forward flow of air in the intake ducts is developed. The engine functions in the series mode in the forward locked position. As the left handle is pulled backward the forward thrust generated by the thrust vectoring nozzles, or ports, is reduced, and the engine functions in the parallel mode. With the left handle pulled all the way back the aircraft moves backward. Movement of the left handle to the right for left causes the aircraft to move to the right or left. The left handle is rotated by the pilot to input vertical thrust performance. The clockwise rotation of the left handle increases lift, a counter clockwise rotation of the left handle decreases lift. The rotation of the left handle opens and closes the vertical lift port and the vertical descent ports. The rotation of the left handle controls ascent and descent. The maintenance of a vertical position has priority over the development of directional movement, or the attitude, of the aircraft. During the transition from VTOL to forward flight the pilot moves the left handle forward and rotates the left handle counter clockwise as forward flight speed increases. This rotation of the left handle decreases air flow through the vertical lift ports, resulting in a greater air flow through the exhaust duct variable converging diverging nozzle. Yaw control remains in the rudder pedals. Depressing the right foot pedal causes a clockwise rotation of aircraft and depressing the left foot depression causing a counter clockwise rotation of the aircraft.

During forward flight the right stick control activates conventional flight control surfaces and the thrust vectoring system of the exhaust duct nozzle. The forward flow of air in the intake duct can be developed during forward flight by pulling the left handle backward from its locked position. The thrust vectoring generated at the nose of the aircraft during forward flight increases flight performance of the aircraft. With the left handle pulled only slightly back from the forward locked position a forward flow of air in the intake duct is developed, and a high forward thrust is maintained, if the right handle is pulled backward, the nose of the aircraft is pitched upward, resulting in a high rate of turn. During this rapid turn the vertical descent ports on the exhaust duct open and the vertical lift ports on the intake duct open to increase the rate of turn of the aircraft.

Pilots stick or handle movements are input signals to a computer that controls the movement of lateral moving flaps, sliding panels, rotational vanes and rotational nozzles on the intake and exhaust ports in a manner that corresponds to the pilots inputs. The thrust is directed to the most extreme handle position. During VTOL the maintenance of vertical position has priority over the aircraft's direction of movement and attitude. The computer develops a vertical lift priority flight envelope during VTOL the pilot stick, or handle, inputs are placed within this vertical lift priority flight envelope. The computer receives information about the position of the thrust vectoring elements, flaps, panels, vanes, and nozzles and activates electrical, or hydraulic, actuators to control the thrust vectoring elements on each port.

Inverting the aircraft and using the vertical descent ports to create lift may allow a inverted hover, or a slow rate of descent with the aircraft inverted. This inverted hover allows the pilot to closely examine a area. It may be possible to develop a nose down hover, or very slow rate of nose down descent.

TRANSITION FROM VTOL TO FORWARD FLIGHT

The transition from vertical takeoff and landing to forward flight involves a transition from thrust vectoring generated lift, to lift generated by the aircraft's wings. When forward flight speed generates enough lift from the aircraft's wings, the propulsion system is shifted from vertical takeoff and landing mode to forward flight mode.

Vertical takeoff and landing thrust vectoring systems using laterally moving flaps or rotational vanes, vector thrust backward to increase forward flight speed. A forward flight speed can be developed by gradually opening the exhaust duct port during the transition to forward flight. As forward flight speed increases the vertical lift ports are closed, and the exhaust duct ports are opened. The propulsion system is shifted from the vertical takeoff and landing, parallel mode, to forward flight, series mode when sufficient forward speed or altitude is attained.

Vertical takeoff and landing systems using rotational nozzles point the intake and exhaust lateral rotational nozzles downward during vertical takeoff and landing. The lateral rotational nozzles are moved backwards slightly to move the aircraft forward. Forward flight speed is also be developed by opening the yaw rotational nozzles on the exhaust and intake ducts, when the yaw rotational nozzles are pointing directly backward. As the aircraft forward flight speed increases the wings generate lift. The pilot moves the left stick forward flight speed and switch the propulsion system from the vertical takeoff and landing mode to the forward flight mode. The lateral rotational nozzles are directed backward during the transition from the vertical takeoff and landing mode to forward flight mode. The intake duct lateral rotational nozzles point progressively further backward during the transition from vertical takeoff and landing to forward flight. When the propulsion system switches from the vertical takeoff and landing mode to forward flight mode the intake duct lateral rotational nozzles are rotated forward. In a forward position the intake duct lateral rotational nozzles point in the direction of aircraft movement through the air. When the lateral rotational nozzles are rotated to a forward position the aircraft's flight can be affected. To increase flight stability during the rotation of the intake duct lateral rotational nozzles to a forward direction position, the exhaust duct lateral rotational nozzles, and flight control surfaces are activated.

BURNERS

After burners located in the exhaust duct are used during forward flight to increase thrust, accelerating the aircraft and increasing flight speed. After burners can be used during vertical takeoff and landing to generate additional lift. Burners (401) can also be placed within the air intake duct. The burners can be used to generate increased thrust from the intake duct thrust vectoring systems.

MOVABLE RADAR REFLECTIVE OR ABSORBING GRID

To reduce radar reflection from the air intake duct and fan, a radar screen, or radar reflecting, or absorbing grid, can be placed within the air intake duct. This radar grid stops radar from entering the air intake duct, and prevents radar that has entered the air intake duct from leaving.

The radar grid is more important when the fan is close to the air intake duct port. Such as the Joint Strike Fighter Boeing concept. This moveable radar reflecting or absorbing grid concept could be used on the Boeing JSF aircraft type.

Moving the radar grid allows unimpeded air flows into the engine when the aircraft is not flying in a stealth mode. In normal flight the radar grid is folded along the side of the air intake duct, or the radar grid is retracted into the fuselage. When a threat exists the radar grid is moved into a position in the air intake duct. The radar grid functions best when located at the opening, or port, or the air intake duct.

The ability to move the radar grid out of the intake duct is important when the aircraft has a high, or super sonic flight speed. If the radar grid remains in the intake duct at high, or super sonic flight speeds the radar grid impedes air flow into the aircraft engine.

Burners may be placed in the air intake duct to increase thrust during VTOL. These burners create high temperature conditions in the air intake duct. These high temperature conditions may destroy radar absorbing paint coatings, or polymer films within, or lining the air intake duct. The use of a movable radar grid is more significant when these radar absorbing paint coatings, or polymer films, cannot be used in the air intake duct, due to high temperatures. If the radar absorbing materials are sensitive to heat the radar grid is pulled into the fuselage, or positioned external to the flaps used to close the air intake duct during VTOL mode.

The F 117 has a radar grid over the air intake duct. The radar grid is not movable. Fuel savings could be realized by using a movable radar grid. The F 117 flight speed may be increased if the radar grid can be moved from the air intake duct during normal flight. The radar grid is moved into the air intake duct when a radar threat exists.

AIR EJECTOR NOZZLES

Hot gases leaving the ports is drawn onto the surface skin of the aircraft. These hot gases flowing onto the fuselage can damage paint coatings and underlying materials. This is a particular problem when the aircraft structure is composed of carbon fiber composites. To prevent the hot gases form contacting the surface of the aircraft air is blown from ejector nozzles around the ports. If hot gases return to the fuselage and are trapped at a particular point air ejector nozzles are positioned to disrupt the flow of hot gases. The air for the ejector nozzles is obtained from the high compression stage of the engine. The gases from the compressor are cooled by passing through a heat exchanger prior to leaving the nozzle.

AIRCRAFT CONFIGURATIONS

The internal duct VTOL propulsion system, the reversing fan VTOL propulsion system, the reversing additional fan VTOL propulsion system, the additional variable pitch fan VTOL propulsion system and the variable pitch primary fan VTOL propulsion system can be used on various aircraft. Thrust vectoring ports controlled by sliding solid or slotted panels, with or without laterally moving flaps, rotational vanes, or rotational nozzles can be used on various aircraft. These VTOL propulsion systems and thrust vectoring systems can be used on a number of types of aircraft.

Single Engine Super Sonic VTOL Fighter (FIG. 35)

A single engine super sonic fighter having a additional fan has greater thrust in forward flight. This increased thrust in forward flight results in a higher flight speed and increased acceleration. The additional fan increases vertical thrust, thus increasing the maximum vertical takeoff and landing weight. To use the thrust vectoring elements on the intake duct ports to increase maneuverability during forward flight, the VTOL propulsion system selected must be able to develop a forward flow of air in the intake ducts rapidly. The propulsion system meeting these requirements is the additional variable pitch fan VTOL propulsion system. Mention is made of the internal duct VTOL propulsion systems ability to rapidly alter air flow in the air intake duct.

To increase thrust vectoring directional control and develop a highly maneuverable aircraft, laterally moving flaps, with 2D rotational vane systems, are used on ports. The lateral moving flaps direct thrust, and engage air flowing by the aircraft, similar to other aircraft control surfaces. The single engine super sonic fighter has exhaust duct ports (300), and intake duct ports (302), with laterally moving flaps, and a variable convergent divergent exhaust duct nozzle, that can be closed. Flaps on top and bottom of the air intake duct ports, can close the air intake duct port during VTOL, and direct air flow into the air intake duct during forward flight. Vertical lift ports (304), are located on the bottom of aircraft. The bottom of the aircraft is flat to reduce radar reflection. Vertical descent ports (306), are located on the top of aircraft. Yaw ports (308), are located on the sides of the aircraft. The flat sides of the aircraft are angled inward to reduce radar reflection. To increase flight control during vertical takeoff and landing and forward flight, reaction control nozzles (310), are placed at the aircraft wing tips. These reaction control nozzles are similar to those used on the Harrier "jump" jet. The air intake ports (311), are located on the top of the aircraft.

With pitch, roll and yaw control maintained by thrust vectoring, using laterally moving flaps on the ports, and reaction control nozzles on the wing tips, the flight control surfaces and the horizontal and vertical stabilizers are eliminated to reduce drag and radar signature. A reduced drag translates into higher flight speeds, reduced fuel use, increased payload and increased range. The elimination of flight control surfaces and the horizontal and vertical stabilizers reduces the construction costs of the aircraft, and weight of the aircraft. The reduced weight of the aircraft reduces the thrust that must be generated for vertical takeoff and landing. The reduced aircraft weight reduces the lift that must be generated by the wings during forward flight. A reduction in lift, reduces the component of drag associated with producing lift. A reduction in drag translates into higher flight speeds, reduced fuel use, increased payload and increased range. Reducing the lift required from the wing during forward flight allows the size of the wing to be reduced. This reduction in wing size reduces weight, and drag resulting in fuel saving, a increase in payload and higher speed.

The complete elimination of the vertical stabilizer, can impair flight stability. To overcome this problem a small vertical stabilizer made using materials transparent to radar may be included in the aircraft design.

The single engine supersonic fighter shown in diagrams uses a modified delta wing structure. The modified delta wing has few reflective edges and surfaces, good structural strength and can carry a large amount of fuel. Landing gear is retracted into the modified delta wing. The reduced landing demands of a VTOL aircraft may reduce the complexity, mechanical strength and weight of landing gear.

Two Engine Super Sonic VTOL Fighter (FIG. 38)

A two engine super sonic VTOL fighter generates greater thrust, or lift, than a single engine fighter. The two engine super sonic VTOL fighter therefore has a greater maximum VTOL weight.

Having a second engine increases safety. If a two engine super sonic VTOL fighter loses one engine it can continue to fly. The two engine super sonic VTOL fighter maintains the characteristics of the single engine super sonic fighter with regard to using variable pitch additional fan VTOL propulsion systems, with laterally moving flaps and 2D rotational vane systems on the ports. The exhaust duct has a variable converging diverging nozzle that can be closed and maximizes forward flight performance.

When a engine is malfunctions on one side of the aircraft, valves (316), on flow ducts (314), connecting the exhaust and intake ducts of the two engines open. This allows some thrust vectoring to be generated on the side of the aircraft with a malfunctioning engine.

Elimination Of Aircraft Structures And Flight Control Surfaces

Thrust vectoring can eliminate the horizontal stabilizer, vertical stabilizer, rudder and elevators creating a tail less aircraft. Thrust vectoring can eliminate flight control surfaces, including the ailerons, slats, flaps, elevators, and rudder. The elimination of these flight control surfaces reduces aircraft weight, construction costs, maintenance, and complexity. A tail less aircraft has a reduced drag during flight. A reduced drag reduces fuel use and increases speed for a given thrust performance. A reduction in aircraft weight translates into greater acceleration, greater payload, and a reduced thrust for VTOL.

It is not necessary to eliminate components and structures. Components and structures may be reduced in size. The minimum requirements to develop a VTOL aircraft are; a VTOL propulsion systems that move air forward in the air intake ducts; vertical lift ports on the intake and exhaust ducts; and the ability to close the air intake duct ports, and the exhaust duct ports.

The VTOL propulsion systems which move air forward in the air intake duct can be used with thrust vectoring systems using rotating cowls, hoods or bonnets and thrust vectoring systems based on flaps and rotational vanes.

Application Of VTOL Propulsion Systems To Existing Aircraft

The vertical takeoff and landing propulsion systems described can be applied to existing aircraft. The vertical takeoff landing propulsion systems most easy applied to the existing aircraft use the vertical takeoff and landing variable pitch fan propulsion system, or the vertical takeoff and landing reversing fan propulsion system. The vertical takeoff and landing internal duct propulsion system is more difficult to apply to existing aircraft as the propulsion system requires ducting to be placed around the fan, increasing the diameter of the engine.

The additional vertical takeoff and landing variable pitch fan, or vertical takeoff and landing reversing fan, are placed in the air intake duct in front of the aircraft's turbofan engine. In some cases the modification required to the air intake duct would be slight. The distance required for the air intake port is between two and three feet. This upper area of the air intake duct must be free of framework structure and other components. The additional fan is in front of the air intake port requiring approximately two feet. This system requires four to five feet of the air intake duct in front of the primary fan.

The vertical lift, vertical descent and yaw ports are made through the walls of the exhaust ducts and intake ducts, and port control panels and thrust vectoring components added. These ports are made through the aircraft's fuselage, and actuator's and mechanisms are located within a fuselage wall.

To apply VTOL propulsion systems to existing aircraft it is desirable for the existing aircraft to have a intake duct that extends near the nose of the aircraft. The F-22 and Joint Strike Fighter, Lockheed Martin or Boeing concepts, have intake duct's extending near the nose of the aircraft. Aircraft such as the F-18 E/F have short intake ducts that may be extended forward to a position near the nose of the aircraft.

Diagrams show port locations on a modified F-22 Raptor.

The variable pitch additional fan VTOL propulsion system is shown applied to the Lockheed Martin Joint Strike Fighter (JSF) concept. The additional fan increases forward flight performance. In the Lockheed Martin concept the additional fan is in a horizontal position, and the fan does not function in forward flight. The weight of a additional fan is not a factor as the Lockheed Martin JSF concept already carries a additional fan. The area of the fuselage used by the horizontal fan can be used for other purposes such as fuel, electronics, or weapon storage. The three bearing swivel duct and the variable nozzle of the Lockheed Martin JSF concept could be maintained and used to vector exhaust duct flows downward during VTOL. The rounded shape of the Lockheed Martin JSF concept exhaust duct nozzle increases the aircraft's radar and infrared signature.

Vertical takeoff landing propulsion systems and thrust vectoring methods can be applied to the F 16, which has a single intake duct and exhaust intake. With two vertical lift ports the placement of reaction control nozzles on the wing tips provides stability during vertical takeoff and landing.

Sub Sonic VTOL Aircraft (FIG. 43)

A aircraft having rotational nozzles has good vertical takeoff and landing and forward flight performance at sub sonic speeds. Lateral rotational nozzles (318), provide pitch and roll control. Yaw control rotational nozzles, on yaw ports (320), provide yaw control. Yaw control rotational nozzles (320), may not be required on the bottom of the aircraft.

As shown by the Harrier combat aircraft the use of rotational nozzles can generate a highly maneuverable aircraft. This is true even when, as in the Harrier, all rotational nozzles operate in unison. This maneuverability is useful in ground support, slow speed air to air combat (Dog fighting), and evasion of ground fire and missiles.

A sub sonic aircraft for passenger or personal transportation can be developed using rotational nozzles and VTOL propulsion systems that direct air forward in the intake ducts. A seating area for four persons (320), has a turbofan engine (322), located behind the passenger compartment. Lateral rotational nozzles (324), are located in front of the passenger compartment (320), and behind the turbofan engine (322). A yaw control rotational nozzle (326), is located behind the turbofan engine (322). To increase flight stability horizontal stabilizers (328), and a vertical stabilizers (330), are included in the design. In forward flight lift is generated by wings (332), of a conventional design. The wings contain fuel tanks. To increase safety flight control surfaces are included in the design. These flight control surfaces being ailerons, elevators, flaps, and rudder. Having rotational nozzles and flight control surfaces increases control during forward flight, and the redundancy of the two systems, increases safety in the case of the failure of a rotational nozzle, or a flight control surface. If the turbofan engine shuts down during forward flight control surfaces stabilize the aircraft for a controlling landing. A parachute (334), stored on the top of the aircraft is deployed the case of failure of the aircraft's flight control and propulsion systems. Inflatable bags located on the bottom of the aircraft can be deployed to slow descent and absorb ground impact. The other VTOL propulsion systems and vectoring thrust systems described can be used to create other VTOL passenger aircraft of similar configuration.

Unmanned Aerial Vehicles (UAV)

UAV's are anticipated to have a increased role in the future of aviation, military and civilian. Currently UAV's are used by the military in a reconnaissance role in a number of vertical takeoff and landing designs. Many UAV's are launched by catapults, or rocket assisted launching systems. The greatest risk to UAV's occurs during landing. A UAV capable of vertical takeoff and landing has a reduced risk of being lost during takeoff and landing. Current UAV's capable of vertical takeoff and landing are based on rotors or propellers.

Naval air operations targeted at land sites operate at a extended range from the Naval battle group. For this reason it is of interest for a UAV to have a good range and a high flight speed. UAV's capable of vertical takeoff and landing using rotors or propellers have a low flight speed, and a high radar signature. For Navy blue water operations the range and speed of UAV's is important as a Naval battle group must control threats from aircraft, surface vessels, and submersible vessels over a very large area.

Naval operations are particularly interested in a UAV capable of vertical takeoff and landing, due to the problems of landing a aircraft on a ship. The area available for landing on a ship is limited, as well, the ship is moving and the landing area may be pitching or rolling at the same time. These problems are reduced when the aircraft can takeoff and land vertically.

The Army and Marines have interest in UAV's for land based operations. The ability of smaller units to conduct area recognizance is increased if a VTOL UAV is available. The expense of training pilots and the rate that pilots leave the military creates pressure to develop UAV's for transport and combat.

Interest is developing in UAV's serving in a transport role. These UAV's would bring materials to both Naval and ground forces. If a position can be supplied by air without requiring a runway the considerable effort of building a runway can be eliminated. Positions can be established where a runway can not be built, or where a runway, or the flight pathway to the runway, are under threat. The helicopter has developed the concept of vertical envelopment. Helicopter rotors have a high radar, low light and noise signature. These problems persist with tilt rotor aircraft such as the V-22 Osprey.

Interest in UAV's serving in a combat role is developing. This combat role being both air to air, and air to ground. The UAV is taking a role in military operations that are too risky for a pilot. The elimination of the pilot reduces weight and complexity. The weight of the pilot, ejection seat, and cockpit is eliminated. The complexity of aircraft is reduced by elimination of pilot flight and weapon input controls, and the information systems used by the pilot. One concepts has a pilot flying a aircraft with several accompanying UAV's under the pilots control.

Small UAV's, or radio controlled aircraft, can be developed using turbofan engines, or internal combustion engines, that move air forward in the intake ducts then vector the air flow downward to create lift near then nose of the aircraft and balance the aircraft during VTOL.

These vertical takeoff landing propulsion systems and vector thrust systems described here can be used to develop UAV platforms functioning in a variety of roles.

Thrust Vectoring Methods Applied To Non-VTOL Aircraft

The thrust vectoring systems described can be used on the exhaust duct of conventional aircraft to increase flight performance. Independent operation of the ports on the exhaust duct can be used to provide pitch, roll and yaw control. The vertical lift and vertical descent ports on the exhaust duct increase the angles of thrust vectoring that can be produced. The variable converging diverging nozzle described can be used for thrust vectoring and to increase performance in forward flight.

Thrust vectoring systems on the exhaust duct can be used to eliminate the horizontal and vertical stabilizers creating a tail less aircraft, that does not takeoff and land vertically, and does not use VTOL propulsion systems. Thrust vectoring systems on the exhaust duct can be used to eliminate control surfaces on a aircraft that does not takeoff and land vertically. The elimination or reduction in size of aircraft structures and flight control surfaces reduces aircraft drag, weight, construction costs and complexity. A reduction in drag, or weight, decreases fuel usage which increases range, payload capability, and flight speed.

These thrust vectoring systems and the exhaust duct thrust vectoring system can be used on solid or liquid propelled rockets, or missiles and ramjets. The flow of combustion gases leaving these rockets, or missiles, is vectored through ports on the sides of the rocket or missile. The ports are controlled by sliding panels and may have rotational vanes, laterally moving flaps, or rotational nozzles. The main nozzle may be variable with throat plates and exhaust duct port flaps. The exhaust duct thrust vectoring system described can be used on rockets, missiles or ramjets.

VTOL Aircraft Using Internal Combustion Engines

The turbofan engine has a core that generates work to move a fan that drives air. A internal combustion engine performs work, the work generated by a internal combustion engine can be used to turn a fan that drives air. The power output of a internal combustion engine per pound of engine weight is low, this is one of the reasons why the turbofan engine has replaced the internal combustion engine on military aircraft. If the payload, fuel capacity and aircraft weight are reduced sufficiently a internal combustion engine can be used in a vertical takeoff and landing aircraft. A passenger transportation aircraft capable of vertical takeoff of landing using a internal combustion engine can be developed.

As shown in FIGS. 43 and 44, this VTOL internal combustion engine aircraft uses the intake ducts to provide lift at the nose of the aircraft. The internal combustion engine (500), is directly behind the passenger compartment. To reduce drag occupants are in a semi reclined position (502), and seated close together. A drive shaft (504), extends from the rear of the internal combustion engine (500), and connects to a vertical takeoff and landing fan (506), and a rear fan (508). Between the vertical takeoff and landing fan and the rear fan, on top of the aircraft, is the air intake port (510).

The vertical takeoff and landing fan (506), is a variable pitch fan. During vertical takeoff and landing the vertical takeoff and landing fan moves air forward into the air intake duct (512). During forward flight the vertical takeoff and landing fan (506), moves air backward into the rear fan (508). During the operation of the propulsion system in the vertical takeoff and landing mode the air intake port (510), is open. During forward flight the air intake port is closed by flaps, panels, or rotating vane mechanisms (514).

The air intake duct port (516), is closed during vertical takeoff and landing by movement of the air intake duct port flap (518). Air moving forward in the air intake duct exits through the air intake duct vertical lift ports (520), or the air intake duct yaw control ports (522). The ports are opened and closed by port control panels with, or without, 2D rotating vane systems, or laterally moving flaps. During forward flight the air intake duct flaps (518), move opening the air intake duct port. During forward flight air is rammed into the air intake ducts.

The rear duct (524), has lateral rotational (526), and yaw rotational nozzles (528). Air flow control valves (530), are located within the rear duct (524), and the intake duct (512). Minimum total port opening and back pressure control within the intake and exhaust ducts is reduced when a internal combustion engine is used for propulsion.

The VTOL internal combustion engine aircraft has conventional wings (532), horizontal stabilizers (534), and vertical stabilizer (536). Control surfaces, flaps, ailerons, elevators and rudder are included for a redundancy that increases safety. Fuel is carried in the wings (532). The nose (540), of the aircraft is used for fuel storage, cargo storage, radar equipment, and landing gear.

The internal combustion engine (500), has a maximized power output using super charging, turbo charging and fuel injection systems. To increase thrust the exhaust pipe (538), from the internal combustion engine is connected to the aircraft rear duct (524).

The internal combustion engine may be connected to a transmission that reverses rotation of the fans, a second transmission is then placed between the VTOL fan and the rear fan.

The internal duct VTOL propulsion system can be used with internal combustion engines. For safety two engines are used. The two engine may be connected in a manner that allows one engine to drive the fan if the other engine is shut down. A fan may be connected to each engine with a flap system to block the fan if the engine shuts down. The air intake port is located between the engines and the fans. Air from the fans is moved forward in the air intake ducts and backward in the exhaust ducts during VTOL.

I claim:

1. A vertical takeoff and landing propulsion system for a aircraft comprising:
   a) a main tubular duct, and
   b) a fan disposed within said main tubular duct, and
   c) means for rotating said fan whereby a airflow is created in said main tubular duct, and
   d) at least one tubular air intake duct having a first end connecting to the forward part of said main tubular duct and a second end at about the forward part of said aircraft
   e) at least one tubular exhaust duct having first end connected to the aft part of said main tubular duct and a second end at about the aft part of said aircraft, and
   f) at least one air intake port located on top of said main tubular duct, and
   g) means for opening said air intake port during vertical takeoff and landing mode of operation and closing said air intake port during forward flight mode of operation, and
   h) the rotation of said fan causing the air flow to move forward in the air intake duct during the vertical takeoff and landing mode of operation, and aft towards the exhaust duct during the forward flight mode of operation, and
   i) means for turning downward said forward airflow at the forward end of said air intake duct during vertical takeoff and landing mode of operation, and
   j) means for turning downward an aft flow in the exhaust duct during vertical takeoff and landing.

2. The aircraft vertical takeoff and landing propulsion system for a aircraft of claim 1 wherein said means for turning the aft flow in the exhaust duct downward during vertical takeoff and landing is further including:
   a) a exhaust duct nozzle at said second end of said exhaust duct, and
   b) a three bearing swivel exhaust duct that rotates to point said exhaust duct nozzle aft during forward flight, and rotates to point said exhaust duct nozzle downward during vertical takeoff and landing.

3. The aircraft vertical takeoff and landing propulsion system for a aircraft of claim 1 wherein said means for turning the aft flow in the exhaust duct downward during the vertical takeoff and landing mode of operation is further including:
   a) at least one port on the bottom of said exhaust duct, and
   b) means for opening said port on the bottom of said exhaust duct during the vertical takeoff and landing mode of operation, and for closed said port on the bottom of said exhaust duct during the forward flight mode of operation, and
   c) means for closing said exhaust duct at a position aft of said port on the bottom of said exhaust duct, during the vertical takeoff and landing mode of operation, and for opening said exhaust duct during forward flight mode of operation, whereby the flow out of said second end of said exhaust duct is blocked during the vertical takeoff and landing mode of operation, and flow out said second end of said exhaust duct is allowed during forward flight mode of operation.

4. The aircraft vertical takeoff and landing propulsion system for a aircraft of claim 3 wherein said means for closing off said exhaust duct aft of said port on the bottom of said exhaust duct, during the vertical takeoff and landing mode of operation, is further including:
   a) a exhaust duct nozzle located at said second end of said exhaust duct, and
   b) means for closing said exhaust nozzle during vertical takeoff and landing mode of operation and opening said exhaust nozzle during the forward flight mode of operation.

5. The aircraft vertical takeoff and landing propulsion system for a aircraft of claim 1 wherein the means for turning the aft flow in the exhaust duct downward during vertical takeoff and landing mode of operation is further including:
   a) at lease two rotational nozzles one located on each side of said exhaust duct, and
   b) means for rotating said rotational nozzles downward in the vertical takeoff and landing mode of operation, and aft in the forward flight mode of operation.

6. The aircraft vertical takeoff and landing propulsion system for a aircraft of claim 1 wherein means for turning the aft flow in the exhaust duct downward during the vertical takeoff and landing mode is further including:
   a) at least two rotational nozzles one located on each side of said exhaust duct, and
   b) means for opening said rotational nozzles on the sides of said exhaust duct during the vertical takeoff and landing mode of operation and for closing said rotational nozzles during the forward flight mode of operation, and
   c) means for rotating said rotational nozzles, on the sides of said exhaust duct, downward during the vertical takeoff and landing mode of operation and rotating said rotational nozzles aft during the forward flight mode of operation, and
   d) means for closing said exhaust duct at a position aft of said rotational nozzles on each side of said exhaust duct, during the vertical takeoff and landing mode of operation, and for opening said exhaust duct during forward flight mode of operation, whereby the flow out of said second end of said exhaust duct is blocked during the vertical takeoff and landing mode of operation, and flow out said second end of said exhaust duct is allowed during forward flight mode of operation.

7. The aircraft vertical takeoff and landing propulsion system for a aircraft of claim 1 wherein the means for turning the forward airflow in the air intake duct downward during the vertical takeoff and landing mode of operation is further including:
   a) a port on the bottom of said air intake duct, and
   b) means for opening said port on the bottom of said air intake duct during vertical takeoff and landing mode of operation, and closing said port on the bottom of said air intake duct during forward flight mode of operation, and
   c) means for closing said forward directed second end of said air intake duct during the vertical takeoff and landing mode of operation, and opening said second end of said air intake duct during forward flight mode of operation.

8. The aircraft vertical takeoff and landing propulsion system for a aircraft of claim 1 wherein the means for turning the forward airflow in the air intake duct downward during the vertical takeoff and landing mode is further including:
   a) at least two rotational nozzles that form said second opening of said air intake duct, said rotational nozzles are located on the sides of said air intake duct, and b) means for rotating said rotational nozzles downward during the vertical takeoff and land mode of operation, and for rotating said rotational nozzles forward during the forward flight mode of operation.

9. The vertical takeoff and landing propulsion system for a aircraft of claim 1 wherein the means for rotating said fan is a gas turbine engine.

10. The vertical takeoff and landing propulsion system for a aircraft of claim 1 wherein the means for rotating said fan is a internal combustion engine.

11. The vertical takeoff and landing propulsion system for a aircraft of claim 1 wherein said air intake port on the top of said main tubular duct is located backward of said fan within said main tubular duct.

12. The vertical takeoff and landing propulsion system for a aircraft of claim 1 wherein:
   a) said fan is a variable pitch fan, and
   b) said air intake port on the top of said main tubular duct is located aft of said variable pitch fan, within said main tubular duct.

13. The aircraft vertical takeoff and landing propulsion system for a aircraft of claim 12 further comprising means for varying the pitch of the blades of said variable pitch fan, so that said variable pitch fan drives air forward during vertical takeoff and landing mode of operation, and drives air aft during forward flight mode of operation.

14. The aircraft vertical takeoff and landing propulsion system for a aircraft of claim 12 wherein said means for rotating said fan is a gas turbine engine.

15. The vertical takeoff and landing propulsion system for a aircraft of claim 12 wherein said means for rotating said fan is a internal combustion engine.

16. The vertical takeoff and landing propulsion system for a aircraft of claim 12 further including:
   a) a second fan disposed within said main tubular duct that is located aft of the said variable pitch fan, and
   b) means for rotating said second fan.

17. The vertical takeoff and landing propulsion system for a aircraft of claim 16 wherein said air intake port on top of said main tubular air intake duct is located between said forward variable pitch fan and said second fan.

18. The vertical takeoff and landing propulsion system for a aircraft of claim 1 further including means for rotating said fan clockwise, during one mode of operation, and counter clockwise, during the other mode of operation, so that said fan moves air forward into the air intake duct during vertical takeoff and landing mode of operation and aft into the exhaust duct during forward flight mode of operation.

19. The vertical takeoff and landing propulsion system for a aircraft of claim 18 wherein said air intake port on top of said main tubular duct is located aft of said fan within said main tubular duct.

20. The vertical takeoff and landing propulsion system for a aircraft of claim 18 further including:
   a) a second fan disposed within said main tubular duct that is located aft of said fan, and
   b) means for rotating said second fan.

21. The vertical takeoff and landing propulsion system for a aircraft of claim 20 wherein the said air intake port on top of said main tubular duct is located between said fan and said second fan.

* * * * *